United States Patent
Palmer Da Silva

(10) Patent No.: US 12,001,268 B2
(45) Date of Patent: Jun. 4, 2024

(54) REDUCING UNITARY ERROR IN A QUANTUM COMPUTATION SYSTEM

(71) Applicant: Rigetti & Co, Inc., Berkeley (CA)

(72) Inventor: Marcus Palmer Da Silva, Lafayette, CA (US)

(73) Assignee: RIGETTI & CO, LLC, Berkeley, CA (US)

( * ) Notice: Subject to any disclaimer, the term of this patent is extended or adjusted under 35 U.S.C. 154(b) by 549 days.

(21) Appl. No.: 17/264,773

(22) PCT Filed: Aug. 12, 2019

(86) PCT No.: PCT/US2019/046231
§ 371 (c)(1),
(2) Date: Jan. 29, 2021

(87) PCT Pub. No.: WO2020/033974
PCT Pub. Date: Feb. 13, 2020

(65) Prior Publication Data
US 2021/0294680 A1    Sep. 23, 2021

Related U.S. Application Data

(60) Provisional application No. 62/717,642, filed on Aug. 10, 2018.

(51) Int. Cl.
*G06F 11/00* (2006.01)
*G06N 10/00* (2022.01)
*G06N 10/70* (2022.01)

(52) U.S. Cl.
CPC ........... *G06F 11/004* (2013.01); *G06N 10/00* (2019.01); *G06N 10/70* (2022.01)

(58) Field of Classification Search
CPC ....... G06F 11/004; G06N 10/00; G06N 10/70
See application file for complete search history.

(56) References Cited

U.S. PATENT DOCUMENTS

| 6,128,764 A | 10/2000 | Gottesman |
| 10,031,791 B1 | 7/2018 | Wallman et al. |
| 11,100,418 B2 * | 8/2021 | Bunyk ................ G06F 11/0751 |

(Continued)

OTHER PUBLICATIONS

Smith, R.S. et al., "A Practical Quantum Instruction Set Architecture," arXiv:1608.03355v2, Feb. 17, 2017, pp. 1-15.

(Continued)

*Primary Examiner* — Justin R Knapp
(74) *Attorney, Agent, or Firm* — Fenwick & West LLP

(57) ABSTRACT

A system and method for randomly accessing pairs of quantum gates associated with any given quantum gate included in a set of quantum instructions allows for the reduction of unitary errors when executing the quantum instructions. The system generates a set of modified quantum instructions using the randomly accessed pair of quantum gates. The modified quantum instructions produce the same result as the unmodified quantum instructions when executed on a quantum processing system that does not introduce error when executing the instructions. Additionally, the modified quantum instructions produce a more accurate result with less error than the unmodified quantum instructions when executed on a quantum processing system that introduces error.

15 Claims, 5 Drawing Sheets

(56) References Cited

U.S. PATENT DOCUMENTS

| | | | |
|---|---|---|---|
| 11,170,305 B2 * | 11/2021 | Burchard | G06N 10/00 |
| 11,307,242 B1 * | 4/2022 | Zeng | G01R 31/2851 |
| 11,361,241 B2 * | 6/2022 | Klimov | G06N 5/01 |
| 11,562,280 B2 * | 1/2023 | Martinis | H03K 19/177 |
| 2009/0259905 A1 | 10/2009 | Silva et al. | |
| 2016/0085616 A1 | 3/2016 | Berkley | |

OTHER PUBLICATIONS

Wallman, J.J. et al., "Noise tailoring for scalable quantum computation via randomized compiling," arXiv:1512.01098v3, Jun. 9, 2016, pp. 1-10.
PCT International Search Report and Written Opinion, PCT Application No. PCT/US2019/046231, dated Jan. 15, 2020, 13 pages.
Greenbaum, D. et al., "Modeling Coherent Errors in Quantum Error Correction," Quantum Science and Technology, Dec. 20, 2017, pp. 1-13, vol. 3, No. 1.

* cited by examiner

REDUCING UNITARY ERROR IN A QUANTUM COMPUTATION SYSTEM

CROSS REFERENCE TO RELATED APPLICATIONS

This application claims the benefit of U.S. Provisional application No. 62/717,642 filed on Aug. 10, 2018, which is incorporated in their entirety by this reference.

BACKGROUND OF THE INVENTION

1. Field of the Invention

This invention relates generally to executing quantum algorithms on a quantum processor, and in particular to reducing errors when executing quantum algorithms.

2. Description of the Related Art

Quantum computation systems excel at solving complex problems which are nearly unsolvable using classical computation systems. However, quantum computation systems are highly complex and their hardware systems are challenging to implement perfectly. In many cases, quantum computation systems introduce error when executing quantum algorithms that are detrimental to obtaining accurate results of the quantum algorithm. These errors can be coherent unitary error (overrotations, miscalibrations, unwanted couplings, etc.), or incoherent stochastic errors (energy relaxation, dephasing, etc.). Accordingly, a system that reduces unitary errors when executing a quantum algorithm on a quantum computation system would be beneficial.

SUMMARY OF THE INVENTION

A method for randomly accessing pairs of quantum gates associated with any given quantum gate included in a set of quantum instructions allows for the reduction of unitary errors when executing the quantum instructions. For example, the quantum instructions include a primary quantum operation in a set of quantum instructions produces a primary operation result when executed by a quantum processor. The system generates a set of modified quantum instructions using a randomly accessed pair of noise reduction operation pairs associated with the primary quantum operation. Generally, the modified quantum instructions include a first quantum gate of the randomly accessed pair of quantum gates, the given quantum gate, and the second quantum gate of the randomly accessed pair of quantum gates. The modified quantum instructions, when executed in series, produce the same result as the unmodified quantum instructions when executed on a quantum processing system that does not introduce error when executing the instructions. Additionally, the modified quantum instructions produce a more accurate result with less error than the unmodified quantum instructions when executed on a quantum processing system that introduces error.

In some cases, quantum instructions can include more than one gate and the quantum processing system can generate modified quantum instructions with similar characteristics to quantum instructions with a single gate. The method can generate reduced quantum instructions by replacing two adjacent randomly accessed gates included in the modified quantum instructions. The reduced quantum instructions also produce a result more accurate with fewer errors than the unmodified quantum instructions. However, the reduced quantum instructions use fewer quantum gates to produce results similar to the unreduced quantum instructions.

The method determines a result of the quantum instructions and determines an error rate of the result. The system can modify the pairs of gates associated with quantum gates based on the determined error rate, improving the accuracy of hybrid quantum algorithms.

The method may be implemented by a system. The system includes a classical processing system including a classical system, a non-transitory computer-readable storage medium ("storage medium"), and a quantum processing system. The storage medium may store instructions for implementing the described method. Further, the method may be instantiated by a classical processing system accessing and executing the computer instructions on the storage medium.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Quantum computations are fundamentally different from classical computations. Real world computing applications rarely use solely quantum computations and are generally a hybridization of quantum and classical computations. However, executing quantum computations requires a highly specific set of hardware and integrating the results of those quantum computations with classical systems is challenging. Described herein is a cloud quantum computing system that allows for the integration of quantum computations by classical processing systems.

I. Quantum Bits

Quantum algorithms, when executed, manipulate and read information stored in a quantum bit (i.e. qubit). A qubit is fundamentally different than a classical bit. A classical bit has two possible states, typically represented as a 0 or a 1. Ostensibly, a qubit also has two measurable outcomes which can likewise represented as a 0 or a 1. However, more precisely, the state of a qubit is a superposition of the two measurable outcomes, i.e. some probability of a 0 state and some probability of a 1 state. Hence, a qubit can encode more information in its state than a classical bit.

The two measurable outcomes of a qubit are known as the basis states. The basis states can be written as $|0\rangle$ and $|1\rangle$. Accordingly, a qubit state is a linear superposition of the basis states. Thus, a qubit state $|\psi\rangle$ can be represented as a linear combination of $|0\rangle$ and $|1\rangle$: $|\psi\rangle = \alpha|0\rangle + \beta|1\rangle$, where $\alpha$ and $\beta$ are complex-valued probability amplitudes of the basis states.

Figure 1A:
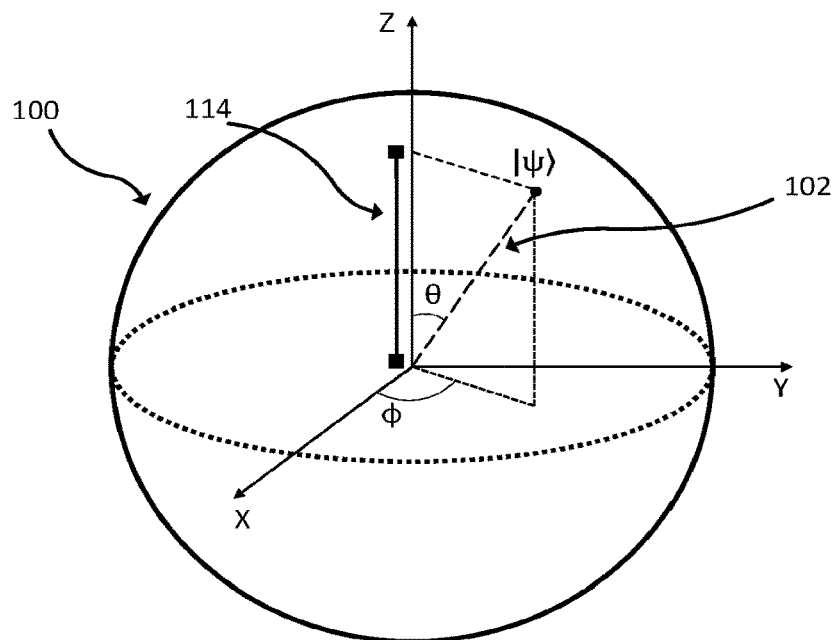
FIG. 1A-1E are illustrations of qubit states represented on a Bloch sphere.
Figure 1B:
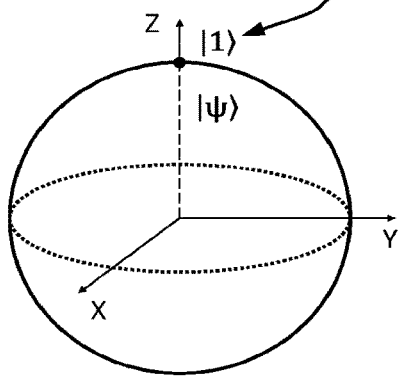
Figure 1C:
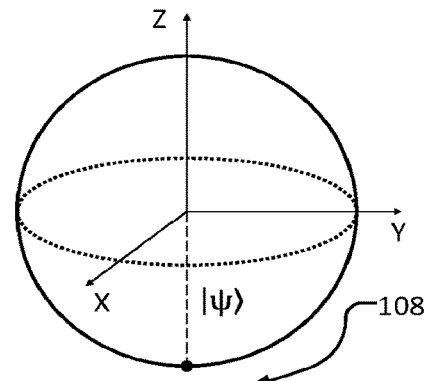
Figure 1D:
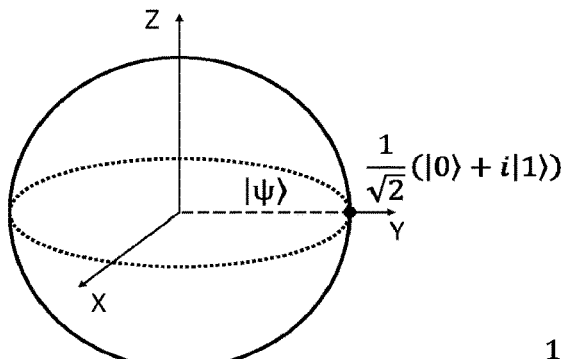
Figure 1E:
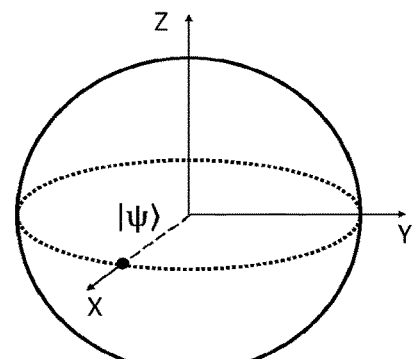

As a visual aid, FIG. 1A is an illustration of the possible states for a single qubit $|\psi\rangle$: 102 using a Bloch sphere 100. On this sphere 100, a classical bit can only be represented at the "north pole" or the "south pole" of the sphere (e.g., the Z axis). As seen in FIG. 1B and FIG. 1C, these poles are the visual representation of the basis state $|0\rangle$ 106 and the basis state $|1\rangle$ 108 on the Bloch sphere 100. Unlike a classical bit, a qubit state can be represented by any point on the surface of the Bloch sphere. For example, the qubit state $|\psi\rangle$ of FIG. 1D can be represented as $|\psi\rangle = (1/\sqrt{2})(|0\rangle + i|1\rangle)$, and the qubit state $|\psi\rangle$ of FIG. 1E can be represented as $|\psi\rangle = (1/\sqrt{2})(|0\rangle + |1\rangle)$.

Measurement of a qubit state is a measurement of the basis states $|0\rangle$ and $|1\rangle$ with probabilities $|\alpha|^2$ and $|\beta|^2$ respectively. Generally, direct measurement of the qubit alters the values of $\alpha$ and $\beta$. Referring to FIG. 1A, a measurement of a qubit state measures the projection of the qubit state (e.g., projection 114 of qubit 102) along an axis of the Bloch sphere (e.g., the vertical axis).

Another dissimilarity between a qubit and a classical bit is that multiple qubits can demonstrate quantum entanglement. Quantum entanglement allows a qubit state to express correlation between a set of qubits states that is more difficult or not possible between classical bits. As an example, the qubit state of two entangled qubits can be expressed as $|\psi\rangle = \gamma_{00}|00\rangle + \gamma_{01}|01\rangle + \gamma_{10}|10\rangle + \gamma_{11}|11\rangle$ where they values are the probability amplitudes of the entangled states. Thus, multiple qubits can store more information in their states than the equivalent number of classical bits.

Generally, quantum algorithms are executed on a quantum computation system to encode information into a qubit (or group of qubits) state, manipulate the qubit state, and measure the qubit state. In many cases, quantum processing systems introduce errors when executing a quantum algorithm and reducing those errors is necessary to determine an accurate result of the quantum algorithm.

II. Cloud Based Quantum Computing System

Figure 2:
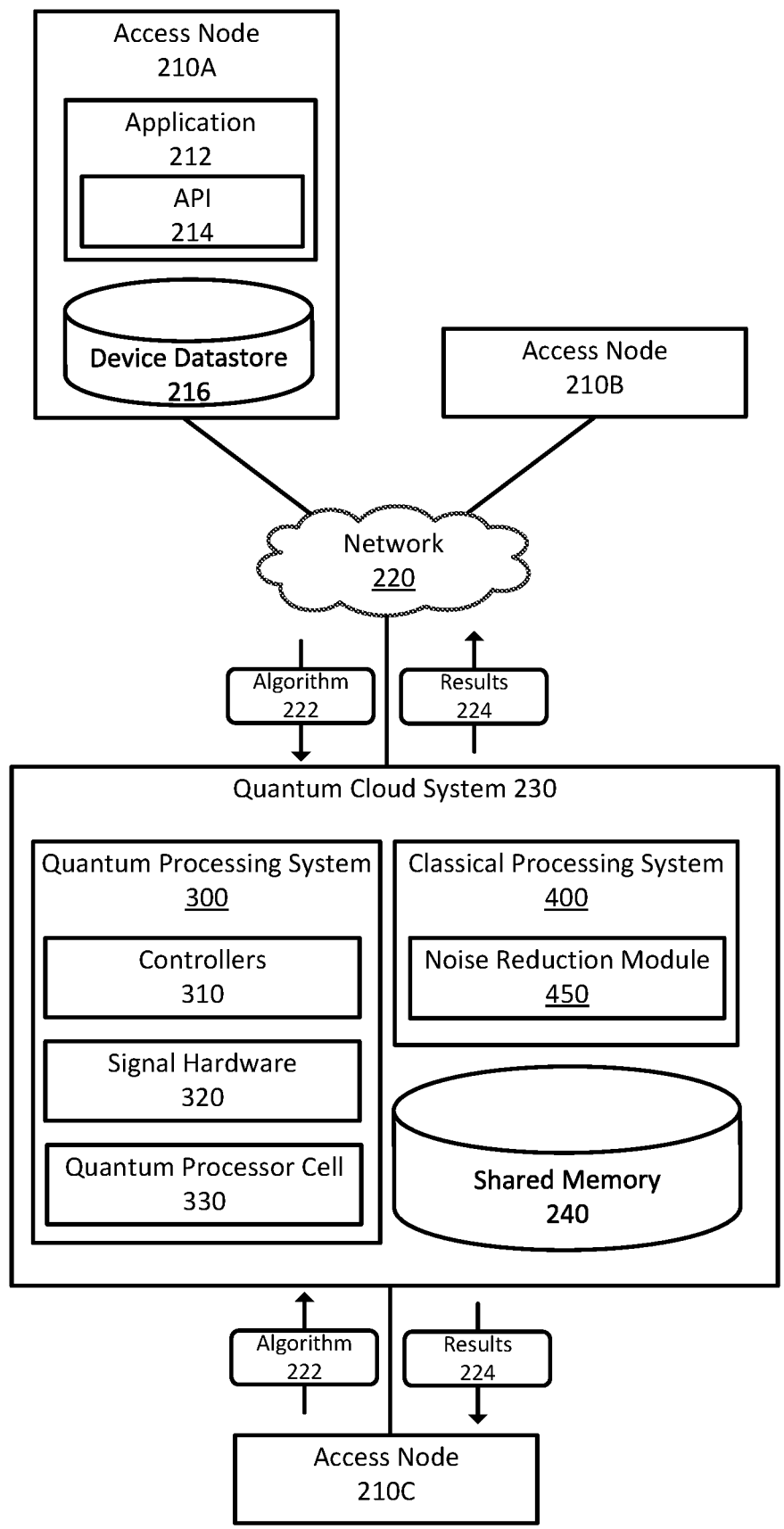
FIG. 2 is an illustration of a cloud quantum computing system, according to one example embodiment.

Execution of quantum algorithms via a quantum computation system requires a complex set of computational hardware that is typically inaccessible to the general population. However, the described computing environment allows for the remote control and execution of quantum algorithms using a network-based quantum computation system. As an example, FIG. 2 is a block diagram of a system environment 200 for a quantum computation system, such as quantum cloud system 230, which can provide the results of quantum computations to access nodes remote from the quantum cloud system 230. The system environment 200 of FIG. 2 includes access nodes 210, a network 220, and a quantum cloud system 230. Alternate embodiments of the system environment can include any number of access nodes 210 and quantum cloud systems 230. The functions performed by the various entities of FIG. 2 may vary in different embodiments.

Within the context of the environment 200 of FIG. 2, a user of an access node 210 generates a set of quantum calculation instructions using an application 212 executing on the access node 210. In some embodiments, the quantum calculation instructions can be written in a defined quantum instruction language (e.g., Quil, See "*A Practical Quantum Instruction Set Architecture*," arXiv:1608.03355v2) as a quantum algorithm (e.g., algorithm 222). A quantum algorithm can include any computer executable representation of quantum instructions, a series of quantum computations, hardware commands, software commands, programs, or control signals. Additionally, a quantum algorithm 222 can additionally include any number of classical calculation instructions.

The implementation or execution of the quantum algorithm 222 by the quantum cloud system 230 includes the determination of at least one result (e.g., result 224) of a quantum operation (e.g., reading a qubit or multiple qubits). The access node 210 transmits the quantum algorithm 222 to the quantum cloud system 230. The quantum cloud system 230 receives the quantum algorithm 222, schedules instructions of the quantum algorithm 220 on the quantum cloud system 230, and executes the quantum algorithm 222 on the quantum cloud system 230. The quantum cloud system 230 determines the result 224 of the quantum algorithm 222 by executing the quantum algorithm 222 using the classical processing system 400 and the quantum processing system 300 (or any combination of the systems). In various other embodiments, the quantum cloud system 230 can access any other computational resource to execute the quantum algorithm 222 (e.g., a supercomputer or other high-performing computer resource). Accordingly, the quantum cloud system 230 transmits the determined result 224 of the quantum algorithm 222 to an access node 210. A detailed example of a quantum algorithm 222, its execution within using a quantum processing system 300, and measuring a result 224 is described in Section VII.

This hybridization of classical processing and quantum processing allows for direct integration of quantum computations and classical computations into a familiar classical computer program framework. Executing quantum calculations on a classical system, and classical calculations on a quantum system, is non-ideal. Thus, the hybrid quantum cloud system allows for leveraging the performance advantages of quantum and classical computations into a single system.

Quantum cloud system 230 can receive any number of quantum algorithms 222 from any number of access nodes 210 in the environment. Additionally, the quantum cloud system 230 includes functionality to execute quantum algorithms 222 received from disparate access nodes 210 such that the quantum algorithms 222 are executed efficiently.

In the environment of FIG. 2, access nodes 210 are any device that can access the functionality of the quantum cloud system 230. In some configurations, access nodes 210 are classical computing devices adapted to execute classical computer programs (e.g. access node 210A). A typical access node 210 can be a lap-top computer, tablet, or cell-phone, or any other client device. The access nodes 210 include software applications, such as application 212, which execute on the processor of the respective access node 210. In one example, the application 212 can be a programming application, such as a compiler and/or integrated development environment, configured to program quantum processing systems. Application 212 can generate a quantum algorithm 222 for determining the result of a quantum calculation on the quantum cloud system 230. Thus, access nodes 210 generate a quantum algorithm 222 that uses quantum calculations in the context of classical application 212.

In various embodiments, applications 212 can be a web browser, a word processor, a networking application, a messaging application, etc. In some embodiments, each application 212 can be linked to a user account on the quantum cloud system 230 associated with an access node 210, an access node user, or group of access node users. Applications 212 of disparate access nodes 210 can communicate with one another and with quantum cloud system 230 via network 220.

In some cases, application 212 uses an application programming interface (API) 214 to communicate with the quantum cloud system 230 through the network 220. The API can expose the application to a quantum machine instruction library. The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by quantum algorithms 222. In some examples, the API 214 is configured to allow the application 212 to generate quantum algorithms 222 that control both the classical processing system and quantum processing system using the quantum machine instruction library.

Additionally, access nodes 210 can include an access node datastore 216. The access node datastore 216 contains information associated with the access node user, the access node 210, a user account, application 212, and application specific data (i.e., data and variables used by or related to quantum algorithms 222). This information can be accessed by the application 212 when generating or transmitting a quantum algorithm 222 to the quantum cloud system 230. In one embodiment, the information can be used to build, store, modify, or update user profiles. The information stored in the device datastore 216 can include: inter-node security metrics, intra-node security metrics, network security metrics, authentication protocols, user account information and preferences, access node information and preferences, access node user information and preferences, a record of preferences and changes, location based information, identities of applications or other application information executing on an access node, and any other information associated with executing quantum algorithms 222 in the environment 200. In some embodiments, an access node can store a local copy of the quantum machine instruction library in device datastore 216.

Access nodes 210 communicate with the quantum cloud system 230 via the network 220, which may include any combination of local area and wide area networks employing wired or wireless communication links. In some embodiments, all or some of the communication on the network 220 may be encrypted or subject to security settings within the environment. In some examples, an access node 210 (e.g., access node 210C) can be directly connected to and communicate directly with quantum cloud system 230.

The quantum cloud system 230 receives, interprets, and executes quantum algorithms 222 from an access node 220. In some examples, a user generates the quantum algorithm 222 on an access node 210 and transmits the quantum algorithm 222 to the quantum cloud system 230. After execution, the quantum cloud system transmits the result 224 of the quantum algorithm 222 to the access node 210. In the example embodiment of FIG. 2, the quantum cloud system 230 includes a quantum processing system 300, a classical processing system 400, and a shared memory 240. The quantum processing system includes controllers 310, signal hardware 320, and a quantum processing cell 330.

The quantum cloud system 230 includes a number of systems and modules, which refers to hardware components and/or computational logic for providing the specified functionality. That is, a system or module can be implemented in hardware elements, firmware, and/or software (e.g., a hardware server comprising computational logic, or computer storage medium comprising computational logic). Other embodiments can include additional systems and modules, can distribute functionality between systems and modules, and can attribute functionality to more or fewer systems or modules. Note that, in general, quantum processing systems and modules require specialty quantum hardware systems as described herein. Further, some modules of the quantum cloud system 230 are designed for control of the specialty quantum hardware systems.

Quantum cloud system 230 includes a classical processing system 400. The classical processing system 400 is described in more detail in regard to FIG. 4. The classical processing system 400 receives a quantum algorithm 222 from an access node 210 and generates a set of algorithm instructions to determine the result of the quantum algorithm 222. The quantum cloud system 230 executes the algorithm instructions to determine the result 224 of the quantum algorithm 222 and returns the result 224 of the quantum algorithm 222 to the access node 210. In one embodiment, the classical processing system 400 determines the set of algorithm instructions based on the quantum instruction language (e.g., Quil) of the received quantum algorithm and the quantum machine instruction library.

Because the quantum algorithm is executing on quantum cloud system 230, which includes both classical and quantum systems, the set of algorithm instructions can likewise include both classical instructions and quantum instructions. Accordingly, the quantum algorithm can be viewed as a quantum/classical algorithm (i.e., a "hybrid algorithm"). The classical instructions are instructions of the hybrid algorithm that execute on the classical processing system 400. Similarly, the quantum instructions are instructions of the hybrid algorithm that execute on the quantum processing system 300. In various configurations, the hybrid algorithm can include only classical instructions or only quantum instructions based on the quantum algorithm.

Algorithm instructions can be scheduled by the quantum cloud system 230 in a variety of manners. As a basic example, the classical processing system 400 may schedule two classical instructions on the classical processing system 400 and a single quantum instruction on the quantum processing system 300, followed by three classical instructions on the classical processing system 400, etc. In another embodiment, the classical processing system 400 directly schedules the quantum instructions on the quantum processing system 500. In another embodiment, executing a classical instruction initiates the scheduling and execution of a quantum instruction on the quantum processing system 300.

Further, the scheduled algorithm instructions can be executed by the quantum cloud system 230 in a variety of manners. Using the previous example, the quantum cloud system 230 may execute the two classical instructions, then the quantum instruction, then the three classical instructions, etc. In some embodiments, the algorithm instructions are executed based on a system clock of the quantum cloud system (e.g., each instruction executes at a specific time). In another embodiment, the algorithm instructions execute sequentially (e.g., a first instruction, a second instruction, etc.). In another embodiment, the classical processing system 400 can schedule classical and quantum operations, or multiple quantum operations, to execute simultaneously on their respective systems.

Whatever the embodiment, the classical processing system 400 may schedule algorithm instructions in any manner across any of the systems and modules of the quantum cloud system 230 such that, when executed, the algorithm instructions determine the result of the quantum algorithm.

Classical processing system 500 includes an error reduction module 450. The error reduction module 450 modifies quantum and/or classical instructions of a hybrid algorithm such the determined result of the algorithm is less impacted by any errors (i.e., may be more accurate). In some embodiments, the error reduction module 450 can add additional quantum or classical instructions not included in the hybrid algorithm such that the additional instructions reduce the impact of the error and improve accuracy of the performed hybrid algorithm. The error reduction module 450 can access the quantum machine instruction library stored in shared memory 240 to modify algorithm instructions. The quantum machine instruction library can include a set of error reduction gate pairs associated with each quantum gate executable by quantum processing system 300. The quantum machine instruction library can also include a set of replacement rules that can reduce a sequential pair of gate pairs (computation gates and error reduction gates) into a single replacement gate. The error reduction module 450 can also quantify error in a determined result of a hybrid algorithm by determining an error rate associated with the execution of quantum instructions on quantum processing system 300. Reducing errors using the error reduction module 450 is described in more detail in regard to FIG. 5.

Quantum cloud system 230 includes a quantum processing system 300. The quantum processing system 300 is described in more detail in regard to FIG. 3. The quantum processing system 300 is configured to execute quantum operations to facilitate determining the result of the quantum algorithm. For example, the quantum processing system receives scheduled quantum instructions from the classical processing system 400 and executes the quantum instructions. In another example, the quantum processing system 300 receives and executes a quantum instruction as a result of the classical processing system 400 executing a classical instruction. Generally, the quantum processing system stores the result of the quantum computation in the shared memory 240. In some embodiments, the quantum processing system 300 returns the result of the quantum computation to the classical processing system 400.

The shared memory 240 stores information that can be used by any system or module of the quantum cloud system 230 to facilitate determining the result of a quantum algorithm (e.g., the quantum processing system 300 and the classical processing system 400). In a particular example, the shared memory 240 stores the result of executed quantum computations by the quantum processing system 300, which are then directly accessible by the classical processing system 400. As noted above, the algorithm instructions can include information stored in the shared memory 240 of the quantum cloud system 230. For example, the shared memory 240 can store a rotation angle as an input parameter that a quantum instruction can access and apply to a qubit when executing. As another example, the shared memory 240 can store the results of two previously executed quantum operations which a classical instruction can multiply using the classical processing system 400.

Providing a more contextual example of the environment 200, consider a researcher working to understand the dynamics of protein folding in a biological environment. The researcher generates computer code modeling protein folding using a hybrid classical/quantum algorithm including several classical and quantum calculations. The code is generated on a client device 210 using an application 112 with an installed API 214 configured to generate code using a quantum programming language, such as the Quil programming language. The researcher transmits the code to the quantum cloud system 230 via the network 220.

The quantum cloud system 230 receives the code and the classical processing system 400 generates a set of algorithm instructions, including both classical instructions and quantum instructions, based on the code. The classical processing system 400 then schedules the algorithm instructions such that the result of the code can be determined. For example, the classical processing system 400 schedules the classical operations on the classical processing system 400, and the remainder of the quantum instructions on the quantum processing system 300. In this example, the quantum processing system 300 executes the quantum instructions and stores the result in the shared memory 240.

In aggregate, the algorithm instructions executed across the systems and modules of the quantum cloud system 230 determine a result to the protein folding code. Once determined, the quantum cloud system 230 transmits the result to the client device 210 via the network 220. The graduate student researcher celebrates the computation and completion of such a complex problem.

III. Quantum Processing System

Figure 3:
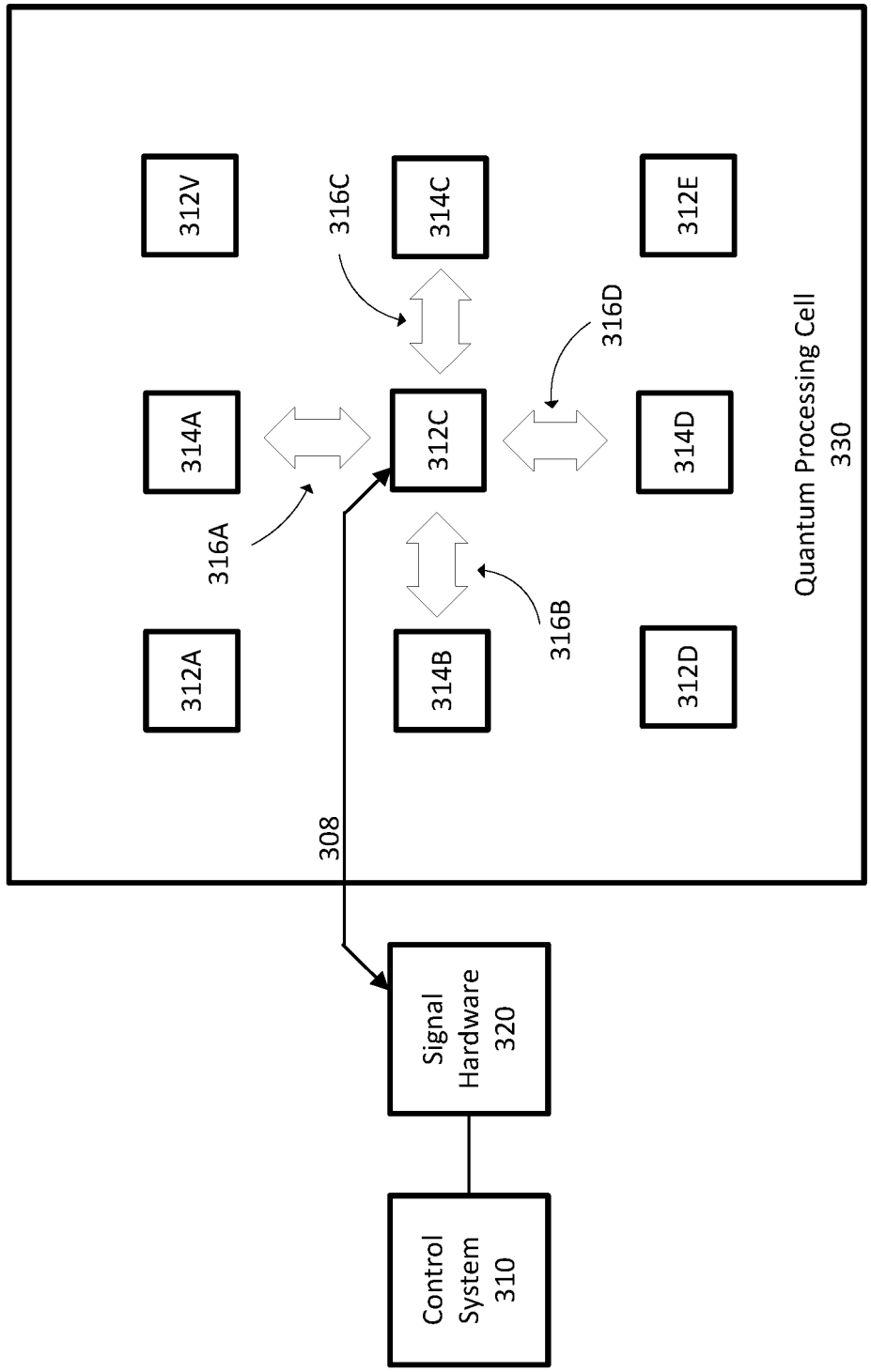
FIG. 3 is an illustration of a quantum processing system, according to one example embodiment.

FIG. 3 is a block diagram showing devices and interactions in an example quantum processing system 300 of the quantum cloud system 230. As shown in FIG. 3, the example quantum processing system 300 includes control system 310, signaling hardware 320, and a quantum processing cell 330. The quantum processing system 300 may include additional or different features, and the components may be arranged differently from the arrangement described herein.

The example quantum processing cell 330 includes a qubit device array, which includes qubit devices arranged in a two-dimensional or three-dimensional lattice structure. In various other embodiments, the qubits may be arranged in any interconnected structure. Nine of the devices in the qubit device array are shown in FIG. 3. In particular, FIG. 3 shows five tunable qubit devices 312 and four other qubit devices 314. In some examples, the tunable qubit devices are implemented as tunable transmon qubit devices, flux qubit devices, flatsonium qubit devices, fluxonium qubit devices, or other types of tunable devices. In some examples, the other qubit devices 314 are also implemented as tunable qubit devices. In some examples, the other qubit devices 314 are implemented as fixed-frequency qubit devices. For instance, other qubit devices 314 may be implemented as fixed-frequency transmon devices or other types of fixed-frequency qubit devices. The devices shown in FIG. 3 may be implemented by other types of devices or components. As an example, one or more of the qubit devices shown in FIG. 3 may be implemented as a resonator device, a coupler device, or otherwise.

In some instances, all or part of the quantum processing cell 330 functions as a quantum processor, a quantum memory, or another type of subsystem. In some examples, the quantum processor includes a quantum circuit system. The quantum circuit system may include qubit devices, resonator devices and possibly other devices that are used to store and process quantum information. In some cases, the quantum processor includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor. In some cases, the quantum processor includes an ion trap system, and the qubit devices are implemented as trapped ions controlled by optical signals delivered to the quantum processor. In some cases, the quantum processor includes a spin system, and the qubit devices are implemented as nuclear or electron spins controlled by microwave or radio-frequency signals delivered to the quantum processor. The quantum processor may be implemented based on another physical modality of quantum computing.

In the example shown in FIG. 3, the devices are arranged in a rectilinear (e.g., rectangular or square) array that extends in two spatial dimensions, and each qubit device has up to four nearest-neighbor qubit devices. In some implementations, the devices can be arranged in another type of array (e.g., an ordered hexagonal array, an unordered random array, etc.). In some instances, the rectilinear array also extends in a third spatial dimension to form a cubic array or another type of three-dimensional array. In some configurations, a third spatial dimension can also include components configured for signal delivery. Signal delivery in the third dimension can allow non-proximally located qubits to interact. More broadly, the quantum processing cell 330 may include additional devices, including additional qubit devices, readout resonators, on chip parametric amplifiers, any type of interconnects, superconducting vias, etc.

In some implementations, the quantum processing cell 330 can process quantum information by applying control signals (e.g., signals 308) to the qubits (e.g., qubits 312 and 314) in the quantum processing cell 300. The control signals 308 can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

Signal hardware 320 includes components that communicate with the quantum processing cell 330. The signal hardware 320 may include, for example, waveform generators, amplifiers, digitizers, high-frequency sources, DC sources, AC sources and other type of components. The signal hardware may include additional or different features and components. In the example shown, components of the signal hardware 320 are adapted to interact with the quantum processing cell 330. For example, the signal hardware 320 can be configured to operate in a particular frequency range, configured to generate and process signals in a particular format, or the hardware may be adapted in another manner.

In some instances, one or more components of the signal hardware 320 generate signals 308, for example, based on control information from control system 310. The signals can be delivered to the quantum processing cell 330 to operate the quantum processor system 300. For instance, the signal hardware 320 may generate signals 308 to implement quantum logic operations, readout operations or other types of operations. As an example, the signal hardware 320 may include arbitrary waveform generators (AWGs) that generate electromagnetic waveforms (e.g., microwave or radio-frequency) or laser systems that generate optical waveforms. The waveforms or other types of signals 308 generated by the signal hardware 320 can be delivered to devices in the quantum processing cell 330 to operate qubit devices, readout devices, bias devices, coupler devices or other types of components in the quantum processing cell 330.

In some instances, the signal hardware 320 receives and processes signals from the quantum processing cell 330. The received signals can be generated by operation of the quantum processing system 300. For instance, the signal hardware 320 may receive signals 308 from the devices in the quantum processing cell 330 in response to readout or other operations performed by the quantum processing cell 330. Signals 308 received from the quantum processing cell 330 can be mixed, digitized, filtered, or otherwise processed by the signal hardware 320 to extract information, and the information extracted can be provided to the control system 310 or handled in another manner. In some examples, the signal hardware 320 may include a digitizer that digitizes electromagnetic waveforms (e.g., microwave or radio-frequency) or optical signals, and a digitized waveform can be delivered to the control system 310 or to other signal hardware components. In some instances, the control system 310 process the information from the signal hardware 320 and provide feedback to the signal hardware 320; based on the feedback, the signal hardware 320 can in turn generate new control signals that are delivered to the quantum processing cell 330.

In some implementations, the signal hardware 320 includes signal delivery hardware that interface with the quantum processing cell 330. For example, the signal hardware 320 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processing cell 330. In some instances, signal delivery hardware performs preprocessing, signal conditioning or other operations on readout signals received from the quantum processing cell 330.

Control system 310 communicates with the signal hardware 320 to control operation of the quantum processing system 300. The control system 310 may include digital computing hardware that directly interface with components of the signal hardware 320. In various embodiments, the control system can include features similar to classical processing system 400. That is, control system 310 may include processors, memory, clocks and other types of systems or subsystems.

Generally, the control system 310 can interpret the quantum instructions generated by classical processing system 400 and generate a hardware-specific control sequences configured to execute the operations proscribed by the quantum machine instructions. For example, the control system 310 may generate control information that is delivered to the signal hardware 320 and converted to control signals that control the quantum processor cell 330.

Control system 310 can include one or more clocks that can assist in scheduling quantum operations. For example, operations performed by the control system 310 may be scheduled for execution over a series of clock cycles, and clock signals from one or more clocks can be used to control the relative timing of each operation or groups of operations. In some cases, the control system 310 schedules control operations according to quantum instructions generated from a quantum (or hybrid) algorithm, and the control information is delivered to the signal hardware 320 according to the schedule in response to clock signals from a clock or other timing system.

In some embodiments, control system can 310 execute classical computer program instructions (e.g., instructions formatted as software, firmware, or otherwise). For example, the control system 310 may execute a quantum processor unit 330 (QPU) driver software, which may include machine code compiled from any type of programming language (e.g., Python, C++, etc.) or instructions in another format. In some cases, QPU driver software receives quantum instructions (e.g., based on information from the cloud quantum computing system 230) and quantum state information (e.g., based on information from the signal hardware 320), and generates control signal and sequences for the quantum processing cell 330 based on the quantum machine instructions and quantum state information.

Control system 310 generate control information (e.g., a digital waveform) that is delivered to the signal hardware 320 and converted to control signals 308 (e.g., analog waveforms) for delivery to the quantum processing cell 330. The digital control information can be generated based on quantum instructions, for example, to execute quantum logic operations, readout operations, or other types of control.

Control system 310 extract qubit state information from qubit readout signals, for example, to identify the quantum states of qubits in the quantum processor cell 102 or for other purposes. For example, the controllers may receive the qubit readout signals (e.g., in the form of analog waveforms) from the signal hardware 320, digitize the qubit readout signals, and extract qubit state information from the digitized signals.

In some implementations, the quantum processing system 300 can span multiple different temperature and noise regimes. For example, the signaling hardware 320 can include a series of temperature stages (e.g., 60 K, 3 K, 350 mK, 300 mK, 5 mK) that decrease between a higher temperature regime of the control system 310 and a lower temperature regime of the quantum processing cell 330. The quantum processing cell 330, and in some cases all or part of the signaling hardware 320, can be maintained in a controlled cryogenic environment. In some examples, the cryogenic environment can be provided, by shielding equipment, cryogenic equipment, and other types of environmental control systems.

In some implementations, the tunable qubit devices 312 are housed between neighboring pairs of the other qubit devices 314 in a device array within the quantum processing cell 330. The quantum states of the respective qubit devices can be manipulated by control signals or read by readout signals generated by the control system 310 and signaling hardware 320. The qubit devices can be controlled individually, for example, by delivering control signals 308 to the respective qubit devices. In some cases, a neighboring pair of qubit devices (e.g., tunable qubit device 312C and other qubit device 314A) is controlled jointly by delivering control signals to the tunable qubit device. In some cases, readout devices can detect the states of the qubit devices, for example, by interacting directly with the respective qubit devices.

In the example shown in FIG. 3, each tunable qubit device 312 has one or more tunable transition frequencies. The transition frequency is the energy level between any two adjacent energy levels in a qubit device. The transition frequency of a qubit device is tunable, for example, by application of an offset field. In particular, the transition frequencies of the tunable qubit devices 312 can be tuned by applying an offset field to the tunable qubit device. The offset field can be, for example, a magnetic flux bias, a DC electrical voltage, AC electrical voltage or another type of field. In some implementations, the tunability of the tunable qubit devices 312 in the quantum processing cell 330 allows neighboring pairs of qubits to be selectively coupled on-demand to perform multi-qubit gates, to entangle neighboring pairs of qubits, or to perform other types of operations. The tunable qubit devices can have a high "on/off" ratio, which refers to the ratio of the effective coupling rate provided by control of the tunable qubit device. In one embodiment, each tunable qubit device can include a superconducting circuit loop including two Josephson junctions and a capacitor structure in parallel with the junctions.

In some implementations, the other qubit devices 314 are implemented as fixed frequency qubit devices. In one embodiment, a fixed frequency qubit device includes a Josephson junction connected in parallel with a capacitor structure. In this example, the transition frequency of a fixed-frequency qubit device is based in part on the Josephson energy of the junction. In some implementations, the coupling of a fixed-frequency qubit device with neighboring fixed-frequency qubit devices allows multi-qubit gate operations to be performed. In this implementation, the frequency of the qubit is not tunable with an offset field, and the qubit devices are less sensitive to low frequency flux noise, yielding improved longer coherence times.

IV. Quantum Computation

In the example quantum processing cell 330 each of the qubit devices can be encoded with a single bit of quantum information. As described in regard to FIG. 1A, each of the qubit devices has two eigenstates that are used as basis states $|0\rangle$ and $|1\rangle$, and each qubit device can transition between the basis states or exist in an arbitrary superposition of the basis states. Generally, the two lowest energy levels (the ground state and first excited state) of each qubit device are defined as a qubit and used as basis states for quantum computation. In some examples, higher energy levels (e.g., a second excited state or a third excited state) are also defined by a qubit device, and may be used for quantum computation in some instances.

In some instances, the information encoded in the qubit devices of the quantum processing cell 330 can be processed by operation of the tunable qubit devices 312. For instance, input information can be encoded in the computational states or computational subspaces defined by some of all of the qubit devices in the quantum processing cell 330. The information can be processed, for example, by applying a quantum algorithm or other operations to the input information. The quantum algorithm may be decomposed as gates or instruction sets that are performed by the qubit devices over a series of clock cycles. For instance, a quantum algorithm may be executed by a combination of single-qubit gates and two-qubit gates. In some cases, information is processed in another manner. Processing the information encoded in the qubit devices can produce output information that can be extracted from the qubit devices. The output information can be extracted, for example, by performing state tomography or individual readout operations. In some instances, the output information is extracted over multiple clock cycles or in parallel with the processing operations. In some aspects of operation, the control system 310 sends control signals 308 to the tunable qubit devices in the quantum processing cell 330 using the signaling hardware 320. The control signals can be configured to modulate, increase, decrease, or otherwise manipulate the transition frequencies of the tunable qubit devices 312.

In the example shown in FIG. 3, the control system 310 sends control signals 308 to the tunable qubit device 312C to generate interactions between the tunable qubit device 312C and individual nearest neighbor qubit devices. In particular, the control signals 308 can generate a first interaction 316A between the tunable qubit device 312C and the other qubit device 314A, a second interaction 316B between the tunable qubit device 312C and the other qubit device 314B, a third interaction 316C between the tunable qubit device 312C and the other qubit device 314C, a fourth interaction 316D between the tunable qubit device 312C and the other qubit device 314D, or a combination of them in series or in parallel.

V. Quantum Gates

As described previously, quantum algorithms include a set of quantum instructions (e.g. computations) that can be executed by the quantum cloud system. Broadly, a quantum instruction can alter the state of a qubit, encode the state of a qubit, measure the state of a qubit, etc. Within the context of this description, a quantum computation (e.g., those generated from a quantum algorithm) is executed by applying a quantum gate to a qubit. Quantum gates are the building blocks of the quantum algorithm and function similarly to logic gates in traditional computation systems and algorithms.

In practical terms, applying a quantum gate entails sending a specific set of signals to the control hardware of a qubit which induces a change in the state of the qubit. In one example embodiment, the control signals are configured to generate interactions that apply quantum gates on the quantum states (e.g., change, measure, etc.) of one or more of the qubit devices. For example, referring to FIG. 3, one or more of the control signals 308 generates an interaction that applies a parametrically activated two-qubit quantum gate to a pair of qubits defined by the tunable qubit device 312C and one or more of the other qubit devices 314. The control signals 308 may activate quantum gates by modulating a transition frequency of the tunable qubit device 312C, for example, at a modulation frequency. For instance, the modulation of the transition frequency over a specified time period can produce the unitary evolution associated with the quantum gate.

Quantum gates can act on any number of qubits. For example, a swap quantum gate acts on two qubits and swaps the state information of the two qubits. Additionally, some two qubit gates are considered controlled gates. In controlled gates, the state of one of the qubits being acted upon acts as a control for the quantum operation. Controlled gates are generally used to generate entangled qubits.

As a practical example of a multi-qubit quantum gate, again referring to FIG. 3, the control system 310 sends control signals 308 to the tunable qubit device 312C via the signaling hardware to generate interactions between the tunable qubit device 312C and individual nearest neighbor qubit devices. In particular, the control signals 308 can generate a first interaction 316A between the tunable qubit device 312C and the other qubit device 314A, a second interaction 316B between the tunable qubit device 312C and the other qubit device 314B, a third interaction 316C between the tunable qubit device 312C and the other qubit device 314C, a fourth interaction 316D between the tunable qubit device 312C and the other qubit device 314D, or a combination of them in series or in parallel.

As previously described, quantum instructions generated from a quantum algorithm 222 can include instructions to apply a quantum gate (or series of quantum gates) on the qubits of the quantum processor 300. In some configurations, the quantum instructions can include additional information to facilitate the application of a quantum gate to a qubit. Thus, the quantum instructions can be represented most generally by G (k), where G is the executed quantum instruction (e.g., a quantum gate(s) acting on a qubit(s)), and k is a set of information (or parameters) associated with the quantum instruction to facilitate its execution. In some configurations, the set of information k can include the location of the qubit on the quantum processor, timing instructions for the execution of the quantum computation, control signal information for applying the quantum gate, information from the shared memory for executing the quantum computation, etc. Additionally, in some configurations, the result R of the of the quantum computation can include changing the state of the qubit, changing the position of the qubit on the quantum processor, measuring the state of the qubit, maintain the state of the qubit, erasing the qubit, etc.

VI. Classical Processing System

Figure 4:
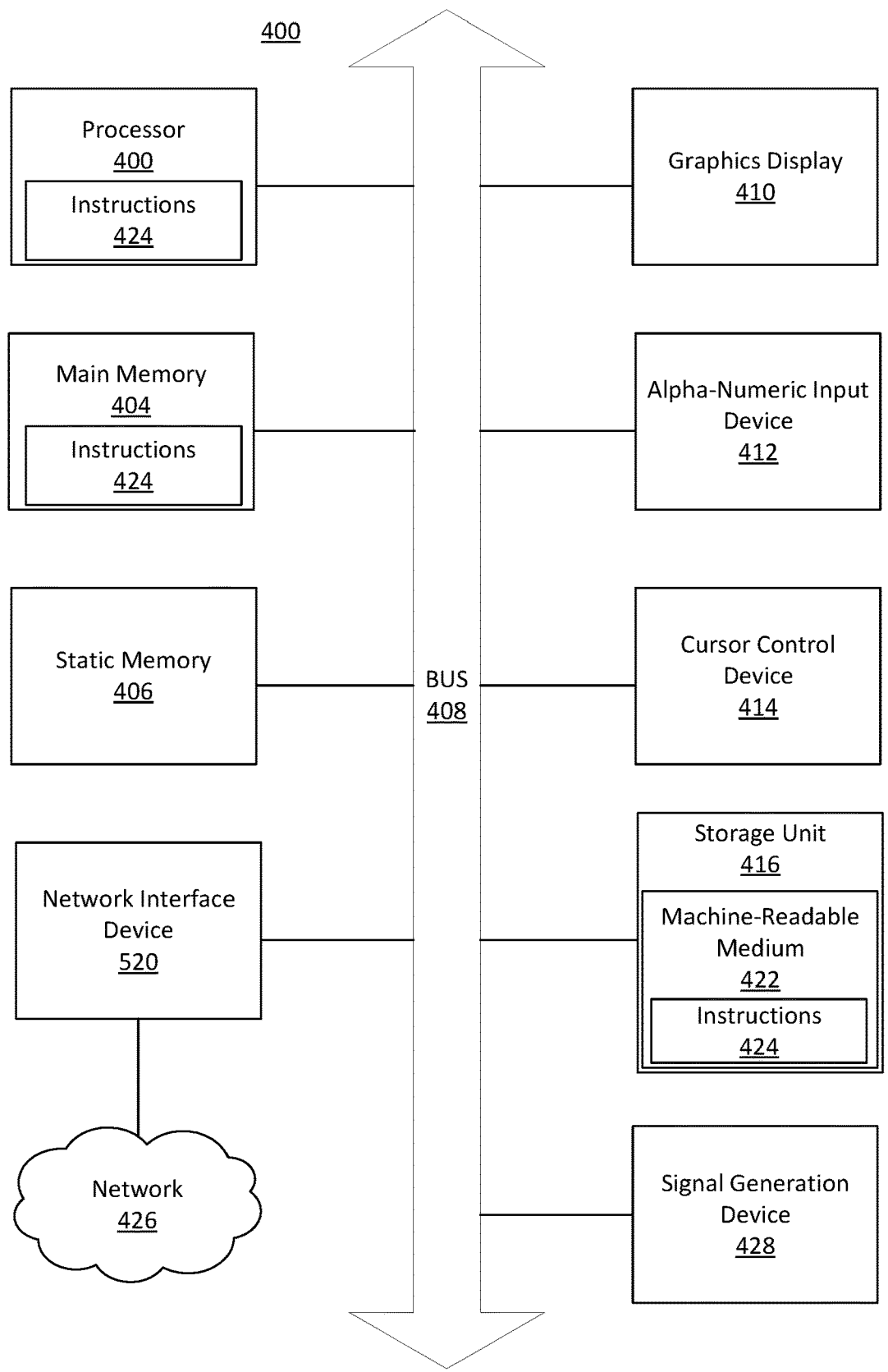
FIG. 4 is an illustration of a classical processing system, according to one example embodiment.

FIG. 4 is a block diagram illustrating components of an example classical processing system 400 that facilitates determining the result of a quantum algorithm in the quantum cloud system of FIG. 2. Additionally, the classical processing system 400 is capable of reading and executing instructions from a machine-readable medium.

As an example, FIG. 6 shows a diagrammatic representation of the classical processing system 400 of FIG. 2. The classical processing system can generate algorithm instructions using the classical processors 402. Further, the classical processing system 400 can be used to execute the classical instructions 424 of the algorithm instructions. In alternative embodiments, the classical processing system 400 operates as a standalone device or a connected (e.g., networked) device that connects to the network system. In the illustrated embodiment, the classical processing system may be a server computer, capable of executing the classical instructions 424 (sequential or otherwise) that specify actions to be taken by the classical processing system 400 to determine the result of the quantum algorithm.

The example classical processing system 400 includes one or more processing units (hereinafter referred to as processor 402). The processor 402 is, for example, a central processing unit (CPU), a graphics processing unit (GPU), a digital signal processor (DSP), a controller, a state machine, one or more application specific integrated circuits (ASICs), a field programmable gate array (FPGA), one or more radio-frequency integrated circuits (RFICs), or any combination of these. The processors 402 can generate control information, for example, based the determined algorithm instructions (e.g., a set of quantum gates, offset field signals, quantum simulation parameters, etc.) to be performed by the quantum computing system 300.

The classical processing system 400 also includes a main memory 404. The computer system may include a storage unit 416. The processor 402, memory 404, and the storage unit 416 communicate via a bus 408. In addition, the computer processing system 400 can include a static memory 406.

Additionally, the classical processing system 400 includes a storage unit 416. The storage unit 416 includes a machine-readable medium 422 on which the classical instructions 424 embodying any one or more of the methodologies or functions described herein can be stored. For example, the classical instructions 424 may include the functionalities of modules and systems of the quantum cloud system 230 described in FIG. 2. The classical instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

In various embodiments, the memory systems can include, for example, a random access memory (RAM), a storage device (e.g., a writable read-only memory (ROM) or others), a hard disk, or another type of storage medium. The memory can include various forms of memory, media and memory devices, including by way of example semiconductor memory devices (e.g., EPROM, EE PROM, flash memory devices, and others), magnetic disks (e.g., internal hard disks, removable disks, and others), magneto optical disks, and CD ROM and DVD-ROM disks.

The classical processing system 400 may also include a graphics display 410 (e.g., to drive a plasma display panel (PDP), a liquid crystal display (LCD), or a projector), alphanumeric input device 412 (e.g., a keyboard), a cursor control device 414 (e.g., a mouse, a trackball, a joystick, a motion sensor, or other pointing instrument), and a network interface device 420, which also are configured to communicate via the bus 408.

The classical processing system includes a signal generation device 418. The signal generation device can include, radio frequency (RF) or microwave (W) generators, radio frequency (RF) or microwave (W) receivers, DC sources, or other type of radio frequency (RF) or microwave (W) devices.

In these implementations, radio frequency (RF) or microwave (W) generators and DC sources of the signal generation devices 418, can each generate control signals based on control information provided by the processors 402. The control signals can be delivered to the quantum processing system 300 by the signal generation devices 418, for example, and interact with circuit devices in the quantum processing cell 330. In some implementations, radio frequency (RF) or microwave (μW) receivers in the signaling hardware 418 can receive and process signals from the quantum processing cell 330. For example, receivers in the signaling hardware 418 can include a digitizer, a microwave source, and other types of signal processing components. The receivers of the signaling hardware 418 can process (e.g., digitize, or otherwise process) the signals from the quantum processing cell 330 and provide the processed information to the processors 402. The processors 402 can extract data to identify the quantum states of qubits in the quantum processing cell 330 or for other purposes.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

In some instances, the classical processing system 400 operates based on a clock cycle or another type of synchronization scheme. For example, the synchronization scheme can be based on a quantum algorithm or quantum processing task. The quantum algorithm or quantum processing task may be expressed as a sequence of instructions corresponding to quantum gates, readouts, or other operations on the qubit devices, and a subset of the instructions can be executed on each clock cycle. In some instances, on each clock cycle, the classical processing system 400 generates control signals to implement a subset of instructions, control signals are delivered to the quantum computation system 300, and qubit readout signals are delivered to the classical processing system 400. The control signals delivered on each clock cycle can be configured, for example, based on the sequence of instructions, based on readout signals from a previous cycle, quantum error correction operations, error matching calculations, other information, or a combination of these.

In some embodiments, client devices may be similarly configured to the classical processing system 400. That is, the client devices can include any elements of the classical processing system, or any additional element, such that the client devices are able to send quantum algorithms or instructions to the quantum cloud system and receive the results of quantum algorithms in response.

VII. Execution of a Hybrid Algorithm

To provide context, execution of an example hybrid algorithm in environment 200 is provided. Take, for example, a hybrid algorithm H generated by an access node 210 and received at quantum processing system 230. Classical processing system 400 translates the hybrid algorithm H into quantum instructions Ψ and classical instructions (D. Quantum processing system 300 executes quantum instructions Ψ to determine a result R. Classical processing system 400 executes classical instructions Φ. In this example, classical instructions Φ store result R of the quantum instructions Ψ in shared memory 240. As previously described, classical processing system 400 also generates appropriate control signals and schedules quantum instructions Ψ and classical instructions Φ such that result R can be accurately determined.

In this example, quantum cloud system 230 receives a hybrid algorithm H including a series of Pauli Z gates. Classical processing system 400 translates the hybrid algorithm H into a set of quantum instructions Ψ including the quantum gates. Classical processing system 400 also generates a set of instruction parameters k for quantum instructions Ψ. The instruction parameters k can define how the quantum instructions are executed on quantum processing system 300. The quantum instructions Ψ can be written as $$\Psi(k)=Z(k) \quad (1)$$

where Ψ is the quantum instructions, k is the instruction parameters (e.g., a number of radians), Z is a Pauli Z gate rotated about the Bloch sphere by k radians. Note that while the Pauli Z gates are represented by "Z" each "Z" can entail a large instruction set for controllers 310, signal hardware 320, and quantum processing cell 330.

Quantum cloud system 230 executes quantum instructions Ψ using quantum processing system 300. Quantum processing system 300 applies the gates included in quantum instructions Ψ to an initial qubit state $\psi_i$ and produces resulting qubit state $\psi_r$. In this example, hybrid algorithm H defines that the initial qubit state is $|0\rangle + e^{i\theta}|1\rangle$. Therefore:

$$\Psi(k)|\psi_i\rangle = Z(k)|\psi_i\rangle = |\psi_r\rangle \quad (2)$$

$$\Psi(k)|\psi_i\rangle = Z(k)(|0\rangle + e^{i\theta}|1\rangle) = |\psi_r\rangle \quad (3)$$

where Ψ the quantum instructions, k is the instruction parameters, $\psi_i$ is the initial qubit state $|0\rangle + e^{i\theta}|1\rangle$, and $\psi_r$ is the resulting qubit state. In some cases, classical processing system 400 generates instructions for quantum processing system 300 to initialize initial qubit $\psi_i$ state to $|0\rangle + e^{i\theta}|1\rangle$. before executing quantum instructions Ψ.

Here, applying the Z-gate to a qubit state W rotates the qubit state W about the Z-axis of the Bloch sphere by k radians. Accordingly, each time quantum processing system 300 applies a Z-gate to a qubit state $|0\rangle + e^{i\theta}|1\rangle$, the resulting qubit state $\psi$ is $|0\rangle + e^{i(\theta+k)}|1\rangle$. Therefore, when executing quantum instructions Ψ the resulting qubit $\psi_r$ is $|0\rangle + e^{i(\theta+k)}|1\rangle$. That is, $$\Psi(k)|\psi_i\rangle = Z(k)(|0\rangle + e^{i\theta}|1\rangle) = |0\rangle + e^{i(\alpha+k)}|1\rangle \quad (4)$$

where Ψ is the quantum instructions, k is the instruction parameters, Z is a Z-gate rotating a state by k radians.

Quantum processing system 300 determines a result R of quantum instructions Ψ by measuring the resulting qubit state $\psi_r$ with the measurement operator M. In the case where k is π/2, the quantum processing system 300 determines the result R is 0 with a probability $p_0$ and 1 with probability $p_1$. That is, $$\langle \psi_r | M | \psi_r \rangle = R = \begin{matrix} 0 \mid p_0 \\ 1 \mid p_1 \end{matrix} \quad (5)$$

where M is the measurement operator, $\psi_r$ is the resulting qubit state, $p_0$ is the probability that the determined result R is 0 when measured with the $|0\rangle$ basis state, and $p_1$ is the probability that the determined result R is 1 when measured with the $|1\rangle$ basis state. In the context of this example, $p_0$ is much greater than $p_1$. In a configuration where the quantum processing system 300 does not generate errors when executing quantum instructions Ψ, $p_0$ is 1 and $p_1$ is 0.

In some configurations, quantum cloud system 230 executes a hybrid algorithm H a number of times to determine result R. In other configurations, quantum cloud system 230 executes hybrid algorithm H once and measures result R a number of times. In both configurations, multiple executions and/or measurements can be due to the probabilistic nature of determining result R of the quantum instructions Ψ of hybrid algorithm H on quantum processing system 300.

VIII. Error in a Quantum Processing System

Execution of a hybrid algorithm as described in Section VII occurred on a quantum processing system 300 that did not introduce errors when executing quantum instructions Ψ (i.e., an ideal quantum processing system). However, in some configurations, quantum processing system 300 can introduce errors when executing quantum instructions (i.e. a non-ideal quantum processing system). Generally, errors are introduced when applying imperfect quantum gates to qubit states when executing quantum instructions. However, errors can be introduced in any number of manners such as, for example, imperfect control signals generated by controllers 310, misconfigured signal hardware 320, fluctuations in the environment of quantum processing cell 330, etc. Errors introduced when executing quantum instructions Ψ can lead to quantum processing system 300 determining an inaccurate result R.

Typically, quantum processing system 300 can introduce stochastic errors and/or unitary errors when executing quantum instructions Ψ, but can also introduce any other type of error. Generally, unitary errors are more detrimental than stochastic errors in determining an accurate result R of quantum instructions Ψ because unitary errors can interfere with each other constructively, leading to greater accumulation of error in complex quantum operations. Therefore, the error reduction module 450 can reduce the impact of introduced errors in determined result R by modifying a quantum instructions Ψ to transform unitary errors into stochastic errors. This process is described in more detail in regards to FIG. 5.

To provide context, an illustration of how stochastic errors and unitary errors affect evaluation of a hybrid algorithm in environment 200.

Stochastic errors are incoherent errors that occur when a quantum gate (or any other quantum operation) is applied to a qubit state $\psi$. Stochastic errors can be quantum gate agnostic (i.e., can occur for any quantum gate) and do not constructively or destructively interfere when multiple stochastic errors occur when executing quantum instructions Ψ.

Unitary errors are coherent errors that occur when a quantum gate (or any other quantum operation) is applied to a qubit state $\psi$ during execution of quantum instructions (e.g., quantum instructions Ψ). Unitary errors are, generally, associated with a specific quantum gate when the quantum gate is applied to a qubit state $\psi$ and each quantum gate can have a different unitary error (i.e., the unitary error introduced when applying quantum gate G is dissimilar from the unitary error introduced when applying quantum gate E). Unitary errors constructively interfere when applying the same quantum gate multiple times in quantum instructions Ψ.

Take, for example, a hybrid algorithm H including a noisy identity gate. Classical processing system 400 translates the hybrid algorithm H into a set of quantum instructions Ψ including the quantum gates. Here, the noisy identity gate can be described in two scenarios: a coherent error with a small rotation of E radians around Z (i.e., equation 8), and an introduction of an incoherent Z error with a probability E (i.e., equation 9). Mathematically, these scenarios are described by:

$$Z_{coh}(\rho) = \left[\cos\left(\frac{\epsilon}{2}\right)I - i\sin\left(\frac{\epsilon}{2}\right)Z\right] \cdot \rho \left[\cos\left(\frac{\epsilon}{2}\right)I - i\sin\left(\frac{\epsilon}{2}\right)Z\right]^\dagger \quad (8)$$

$$Z_{incoh}(\rho) = (1-\epsilon)\rho + \epsilon Z \cdot \rho \cdot Z \quad (9)$$

Generally, applying an identity gate to a quantum state results in the same quantum state. However, as the identity gate is noisy, error can be introduced into the resulting quantum state. For example, in scenario A, after one application of the coherent gate $Z_{coh}$ the probability that quantum processing system 300 measure the correct resulting state $\psi_r$ is 1−ϵ for some initial quantum states $\psi_i$. If the noisy identity gate is applied an integer number of times $$\left(\text{e.g., } N = \frac{\pi}{\epsilon}\right),$$

the rotations add up coherently resulting in an overall rotation of π radians. Accordingly, the rotations would take, in one example, the initial state $$|\psi_i\rangle = \frac{1}{\sqrt{2}}|0\rangle + \frac{1}{\sqrt{2}}|1\rangle$$

to the orthogonal resulting quantum state $$|\psi_r\rangle = \frac{1}{\sqrt{2}}|0\rangle - \frac{1}{\sqrt{2}}|1\rangle.$$

z,35Thus, due to the coherent error, the quantum processing system 300 has 0 probability of measuring the correct result R from the resulting quantum state $\psi_r$ when the coherent gate $Z_{coh}$ is applied to the initial quantum state $\psi_i$. In scenario B, after one application of the coherent gate $Z_{incoh}$ the probability that quantum processing system 300 measure the correct resulting state $\psi_r$ is $1-\epsilon$ for some initial quantum states $\psi_i$. In this sense, the scenarios are equivalent. However, in scenario B, if the noisy identity gate is applied an integer N number of times, the probability that the quantum processing system 300 measures the correct result R from the resulting quantum state $\psi_r$ is $(1-\epsilon)^N$. Therefore, due to the incoherent error, the quantum processing system always has a finite probability of measuring the correct result R from the resulting quantum state $\psi_r$ when the coherent gate $Z_{coh}$ is applied to the initial quantum state $\psi_i$. A more robust example of these concepts are provided in the attached Appendix A.

VIII.A. Stochastic Errors

To continue, the execution of a quantum algorithm including stochastic errors will be described in more detail. Take, for example, quantum instructions $\Psi$ including three Pauli-Z gates which introduce a stochastic error every time the Pauli Z-gate is applied to a qubit state $\psi$ (i.e., an S-error Z-gate). That is, $$\Psi(k) = Z_{SE}(k) Z_{SE}(k) Z_{SE}(k) \quad (10)$$

where $\Psi$ is the quantum instructions, k is the instruction parameters, and $Z_{SE}$ is an S-error Z-gate.

Quantum processing system 300 applies quantum instructions $\Psi$ to an initial qubit state $\psi_i$ and produces resulting qubit state including stochastic errors $\psi_{r,SE}$. The stochastic errors are introduced by S-error Z-gates $Z_{SE}$. That is, using density matrix notation for the qubit state $\psi_i$, $$\Psi(k)\rho_i = Z_{SE}(k) Z_{SE}(k) Z_{SE}(k)\rho_i = \rho_{r,SE} \quad (11)$$

where $\Psi$ is the quantum instructions, k is the algorithm parameters (e.g., a rotation by k radians), $Z_{SE}$ is an S-error Z-gate, $\rho_i$ is the initial qubit state, and $\rho_{r,SE}$ is the resulting qubit state including stochastic errors.

Each execution of the S-error Z-gate $Z_{SE}$ introduces a stochastic error that, for example, causes the qubit state $\psi$ to rotate about the Bloch sphere in an inadvertent manner (non-constructively, or non-destructively). Therefore, when applied to an initial qubit state $\psi_i$, multiple applications of the S-error Z-gate $Z_{SE}$ causes each subsequent qubit state $\psi$ to have some amount of error. In some cases, assuming that the stochastic errors are very small, the resulting qubit state including stochastic errors $\psi_{r,SE}$ can be similar to the resulting qubit state $\psi_r$ not including stochastic errors. In other cases, the stochastic errors are larger and can result in a qubit state that is more different to the resulting qubit state $\psi_r$ not including stochastic errors. Whatever the case, the resulting qubit state including stochastic errors $\psi_{r,SE}$ may have some probability of being measured as a resulting qubit state that does not include stochastic errors $\psi_r$. That is, using density matrix notation for the qubit state $\psi_i$, $$\Phi(k)\rho_i = Z_{SE} Z_{SE} Z_{SE} \rho_i = \rho_{r,SE} \sim \rho_r \quad (12)$$

where $\Psi$ the quantum instructions, k is the algorithm parameters, $\rho_i$ is the initial qubit state, $Z_{SE}$ is an S-error Z-gate, and $\sim$ represents that the resulting qubit state including stochastic errors (i.e., $\rho_{r,SE}$) has some probability of being the resulting qubit state not including stochastic errors (i.e., $\rho_r$).

Given this, quantum processing system 300 determines a result including stochastic errors $R_{SE}$ of quantum instructions $\Psi$ by measuring the resulting qubit state including stochastic errors $\psi_{r,SE}$ with the measurement operator M. Because there is some probability that the resulting qubit state including stochastic errors is the resulting qubit state not including stochastic errors, the determined result including stochastic errors $R_{SE}$ with probabilities $p_{0,SE}$ and $p_{1,SE}$ have some probability of being the same as $p_0$ and $p_1$, respectively. That is, using density matrix notation for the qubit state $\psi_{r,SE}$, $$tr\{M\rho_{r,SE}\} = R_{SE} = \begin{array}{l} 0 \mid p_{0,SE} \text{ where } p_0 \sim p_{0,SE} \\ 1 \mid p_{1,SE} \text{ where } p_1 \sim p_{1,SE} \end{array} \quad (13)$$

where M is the measurement operator, $\rho_{r,SE}$ is the resulting qubit state, $p_{0,SE}$ is the probability that the determined result $R_{SE}$ is 0 when measured with the $|0\rangle$ basis state, and $p_{1,SE}$ is the probability that the determined result $R_{SE}$ is 1 when measured with the $|1\rangle$ basis state. The measurement probabilities $p_{0,SE}$ and $p_{1,SE}$ including stochastic errors have some probability of being the same as probabilities $p_0$ and $p_1$ of the same quantum instructions $\Psi$ not including stochastic errors. Therefore, stochastic errors can be viewed, functionally, as a probabilistic error when measuring the result of quantum instructions $\Psi$.

VIII.B Unitary Errors

To continue, the execution of a quantum algorithm including stochastic errors will be described in more detail. Take, for example, quantum instructions $\Psi$ including three Pauli-Z gates which introduce a unitary error every time the Pauli Z-gate is applied to a qubit state $\psi$ (i.e., a U-error Z-gate). That is, $$\psi(k) = Z_{UE} Z_{UE} Z_{UE} \quad (14)$$

where $\Psi$ is the quantum instructions, k is the algorithm parameters, and $Z_{UE}$ is a Pauli U-gate that introduces unitary errors.

Quantum cloud system 230 executes quantum instructions $\Psi$ using quantum processing system 300. Quantum processing system 300 applies quantum instructions $\Psi$ to an initial qubit state $\psi_i$ and produces resulting qubit state including unitary errors $\psi_{r,UE}$. The unitary errors are introduced by U-error Z-gates $Z_{UE}$. That is, $$\Psi(k)|\psi_i\rangle = Z_{UE} Z_{UE} Z_{UE} |\psi_i\rangle = |\psi_{r,UE}\rangle \quad (15)$$

where $\Psi$ the quantum instructions, k is the instruction parameters, $\psi_i$ is the initial qubit state, $Z_{UE}$ is a U-error Z-gate, and $\psi_{r,UE}$ is the resulting qubit state including unitary errors.

Here, the unitary error causes the qubit state $\psi$ to, for example, rotate about the X-axis of the Bloch sphere $\pi/16$ radians every time the U-error Z gate is applied to a qubit state $\psi$ (rather than no rotation about the X axis). Therefore, when applied to an initial qubit state $\psi_i$ multiple applications of the U-error Z-gate $Z_{UE}$ causes the qubit state $\psi$ to, inadvertently, constructively rotate about the Bloch sphere due to the unitary errors. In some cases, the unitary errors cascade when executing quantum instructions $\Psi$ and the resulting qubit state including unitary errors $\psi_{r,UE}$ is highly dissimilar from the resulting qubit state $\psi_r$ not including unitary errors. Therefore, for some initial qubit states, the resulting qubit state including unitary errors can be orthogonal to the resulting qubit state not including unitary errors. That is, $$\Psi(k)|\psi_i\rangle = Z_{UE}Z_{UE}Z_{UE}|\psi_i\rangle = |\psi_{r,UE}\rangle \neq |\psi_r\rangle \qquad (16)$$

where $\Psi$ is the quantum instructions, k is the instructions parameters, $\psi_i$ is the initial qubit state, $Z_{UE}$ is the U-error Z-gate, and $\neq$ represents that the resulting qubit state including unitary errors (i.e., $\psi_{r,UE}$) has some probability of being orthogonal to the resulting qubit state without unitary errors (i.e., a probability of being wrong).

Quantum processing system 300 determines a result including unitary errors $R_{UE}$ of quantum instructions $\Psi$ by measuring the resulting qubit state including unitary errors $\psi_{r,UE}$ with the measurement operator M. The determined result $R_{UE}$ is 0 with a probability $p_{0,UE}$ and 1 with probability $p_{1,UE}$. That is, $$\langle \psi_{r,UE} | M | \psi_{r,UE} \rangle = \begin{array}{l} 0 \mid p_{0,UE} \text{ where } p_{0,UE} \neq p_0 \\ 1 \mid p_{1,UE} \text{ where } p_{1,UE} \neq p_1 \end{array} \qquad (17)$$

where M is the measurement operator, $\psi_{r,UE}$ is the resulting qubit state including unitary errors, $p_{0,UE}$ is the probability that the determined result $R_{UE}$ is 0 when measured with the $|0\rangle$ basis state, and $p_{1,UE}$ is the probability that the determined result $R_{UE}$ is 1 when measured with the $|1\rangle$ basis state. The measurement probabilities $p_{0,UE}$ and $p_{1,UE}$ including unitary errors are highly dissimilar to measurement probabilities $p_0$ and $p_1$ not including unitary errors. In fact, because the resulting qubits states including unitary errors $\psi_{r,UE}$ has some probability of being orthogonal to the resulting qubit states not including unitary errors $\psi_r$, there is some probability that the probabilities $p_{0,uE}$ and $p_{1,uE}$ will be incorrect and will not equal $p_0$ and $p_1$.

VIII.C Operator Description of Introduced Error

It can be useful to generalize the errors introduced when executing quantum instructions as noise operators. Therefore, herein, quantum gates that introduce errors, either unitary or stochastic, when executing quantum instructions $\Psi$ can be referred to a noisy quantum gate, e.g., noisy quantum gate $G_N$. Similarly, quantum gates that do not introduce errors when executing quantum executing $\Psi$ can be referred to as a nominal quantum gates, e.g., nominal quantum gate G. A noisy quantum gate $G_N$ can be represented as a noise operation $N_G$ combined with a nominal quantum gate G. That is, $$G_N = N_G G \qquad (18)$$

where $G_N$ is a noisy quantum gate, $N_G$ is a noise operation, and G is a nominal quantum gate.

Applying a noisy quantum gate $G_N$ to an initial qubit state Wi can produce a resulting noisy quit state $\psi_{r'}$ that includes an error (either stochastic or unitary). Noisy quantum gates $G_N$ and their resulting noisy qubit states $\psi_{r'}$ can be represented as, using density matrix notation for the qubit state $\psi_{r'}$, $$G_N \rho_i = N_G G \rho_i = \rho_{r'} \qquad (19)$$

where $G_N$ is a noisy quantum gate, $\rho_i$ is the initial qubit state, $N_G$ is a noise operation, G is a nominal quantum gate, and $\rho_{r'}$ is a resulting noisy qubit state.

The resulting noisy qubit state $\psi_{r'}$ produced by a noisy quantum gate $G_N$ acting on an initial qubit state $\psi_i$ is dissimilar from the resulting qubit state $\psi_r$ produced by a nominal quantum gate G acting on a similar initial qubit state $\psi_i$. Accordingly, noisy result R' determined result from measuring the resulting noisy qubit state $\psi_{r'}$ is dissimilar from result R determined by measuring resulting qubit state $\psi_r$. That is, the result of the quantum algorithm is, using density matrix notation for the qubit state $\psi_{r'}$, $$tr\{M\rho_{r'}\} = R' \qquad (20)$$

where M is the measurement operator, $\rho_{r'}$ is the resulting noisy qubit state, and R' is the noisy result. The level of dissimilarity between result R and noisy result R' is based on the type and degree of error causing the noisy resulting qubit state $\psi_{r'}$ (e.g., the quantum gates introducing the errors). For example, while both stochastic and unitary errors are detrimental in determining an accurate result R of a quantum algorithm $\Psi$, unitary errors introduce a larger dissimilarity between R' and R than stochastic errors. This effect is more pronounced when the quantum instructions include long sequences of quantum gates. Therefore, the error reduction module 450 is configured to modify quantum algorithm $\Psi$ to reduce unitary errors and determine a more accurate result R'.

VIII.D Quantifying Error

In some embodiments, the error reduction module 450 is configured to quantify errors in executed quantum instructions $\Psi$. Quantifying error in executed quantum instructions $\Psi$ can include analyzing results or executed quantum instructions. In one example, quantum instructions can be executed multiple times to determine a result R (i.e., a determined result R is an aggregations of result $R_i$). In this case, the error reduction module 450 can determine which results $R_i$ are statistically significant outliers. Based on this analysis, the error reduction module 450 can determine an error rate for executed quantum instructions. In some examples, randomized benchmarking or gate set tomography can be used to quantify an error rate.

IX. Modifying a Quantum Algorithm to Reduce Unitary Errors

In some embodiments, quantum cloud system 230 includes a non-ideal quantum processing system 300. Accordingly, quantum cloud system receives a hybrid algorithm H and modifies the quantum instructions $\Psi$ to reduce unitary errors and determine a more accurate result R. In one configuration, the error reduction module 450 modifies the quantum instructions $\Psi$ by adding quantum gates that reduce unitary errors introduced when executing quantum instructions $\Psi$.

IX.A Example Process Flow for Reducing Error

Figure 5:
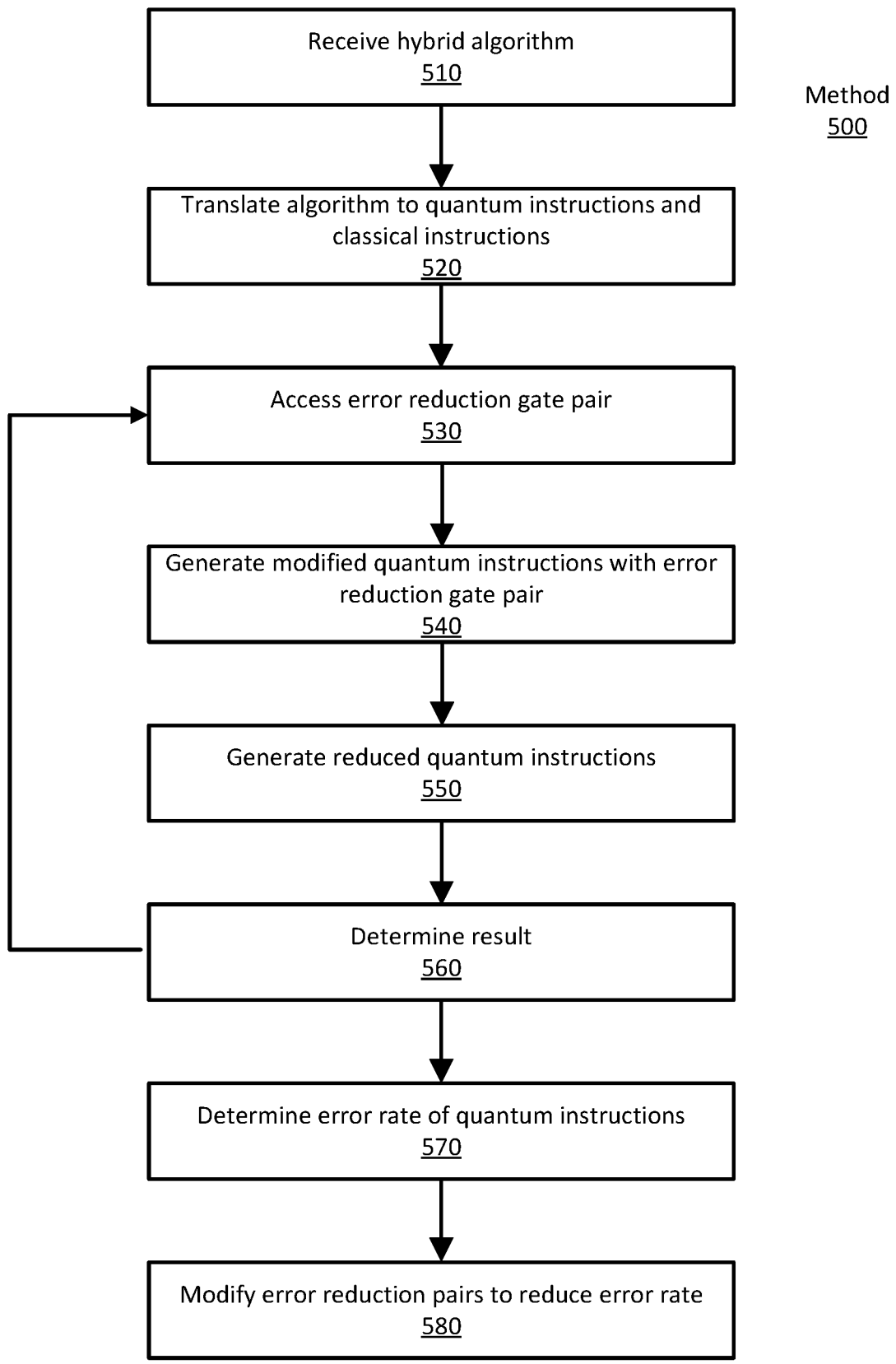
FIG. 5 is a flow diagram on a process flow for modifying quantum instructions to reduce errors in determined results, according to one example embodiment.

FIG. 5 is a flow diagram illustrating a method of modifying quantum instructions to reduce introduced unitary errors and determine a more accurate result, according to one example embodiment. The method 500 is agnostic in regard to the type of quantum processing system 300 that performs the method 500. That is, unitary errors are reduced if the quantum processing system 300 is a spin system, an ion trap, a superconducting circuit, etc.

Quantum cloud system 230 receives 510 a hybrid algorithm 222 from an access node 210 via network 220. In some examples, rather than receiving a hybrid algorithm 222 from an access node 210, the quantum cloud system 230 may access the hybrid algorithm 222 from a shared memory 240. Classical processing system 400 translates 520 the hybrid algorithm into quantum instructions $\Psi$ and classical instructions $\Phi$ such that quantum cloud system 230 can determine a result R* of hybrid algorithm H. Quantum instructions $\Psi$ include at least a primary quantum gate that produces a result R when executed on quantum processing system 300. In other examples, quantum instructions $\Psi$ can include any number of quantum gates (e.g., quantum operations). Importantly, the quantum gates in the quantum instructions $\Psi$ can be any type of quantum gate. Some previous methodologies required quantum gates employing special classes of quantum operations (e.g., Clifford group operations, operations that preserve the dihedral group, etc.) to perform a similar function. Additionally the method 500 may be applied to Noisy Intermediate-Scale Quantum (NISQ) algorithms, rather than just encoded as fault-tolerant quantum computations.

The error reduction module 450 accesses 530, at random, a primary error reduction gate pair of a set of primary error reduction gate pairs previously associated with the primary gate from shared memory 240. Error reduction gate pairs are pairs of quantum gates that, when executed about their associated quantum gate, produce the same result R as the primary gate when executed on an ideal quantum processing system. Additionally, error reduction gate pairs are pairs of quantum gates that, when executed about their associated quantum gate, reduces the impact of any errors that may be introduced into a result when the primary gate is executed on a non-ideal quantum processing system. Error reduction gate pairs can be applied to any of the quantum gates in an algorithm. Generally, error reduction gate pairs transform the unitary error introduced when applying a primary gate to a qubit state into stochastic error.

Each gate executable by quantum processing system 300 can have an associated set of error reduction gate pairs. In some embodiments, the error reduction gate pairs are determined by a system administrator and stored in shared memory 240. Therefore, in an embodiment where the quantum instructions include a primary gate and a secondary gate, the error reduction module 450 can select a secondary error reduction gate pair of a set of secondary error reduction gate pairs associated with the secondary gate.

The error reduction module 450 generates 540 modified quantum instructions $\Psi_M$ that reduce the impact of any introduced errors. The modified quantum instructions $\Psi_M$ may generate a more accurate result R when executed sequentially by quantum processing system 300. For example, the error reduction module 450 generates 540 modified quantum instructions $\Psi_M$ including (in sequence) the first gate of the primary error reduction pair, the primary gate, and the second gate of the primary error reduction pair. In the example embodiment where the quantum instructions include a primary gate and a secondary gate, the error reduction module 450 generates modified quantum instructions $\Psi_M$ including (in sequence) the first gate of the primary error reduction pair, the primary gate, the second gate of the primary error reduction pair, the first gate of the secondary error reduction pair, the secondary gate, and the second gate of the secondary error reduction pair. The reduced quantum instructions $\Psi_R$, when executed sequentially by quantum processing system 300, produce a result R' including less error than result R from quantum instructions $\Psi$.

The error reduction module 450 generates 550 reduced quantum instructions $\Psi_R$ based on modified quantum instructions $\Psi_M$, if applicable. Generally, reduced quantum instructions $\Psi_R$ include a replacement gate that replaces two sequential gates from error reduction pairs. That is, in the example where the modified quantum instructions include a primary gate and a secondary gate, the error reduction module 450 generates reduced quantum instructions $\Psi_R$ by selecting a replacement gate to replace the second gate of the primary error reduction pair and the first gate of the secondary error reduction pair. That is, the reduced quantum instructions PR include the first gate of the primary error reduction pair, the primary gate, the replacement gate, the secondary gate, and the second gate of the secondary error reduction pair. The reduced quantum instructions $\Psi$ R, when executed sequentially by quantum processing system 300, produce a result R" including less error than result R from quantum instructions $\Psi$ while having fewer operations than modified quantum operations $\Psi_M$.

Quantum cloud system 230 executes quantum instructions $\Psi_M$, modified quantum instructions $\Psi_M$, or reduced quantum instructions $\Psi_R$ on quantum processing system 300 to determine 560 a result $R_i$. Generally, modified quantum instruction $\Psi_M$ produce a more accurate result R' than quantum instructions $\Psi$. Reduced quantum instructions $\Psi_R$ produce a more accurate result R" than quantum instructions $\Psi$ while executing more quickly than modified quantum instructions $\Psi_M$.

In some configurations, quantum cloud system 230 determines a result R* of the hybrid algorithm by executing quantum instructions over a number of iterations. In this case, determining a result R* can include aggregating the determined results $R_i$ of quantum instructions over several iterations of execution. The error reduction module 450 can select a new set of error reduction gate pairs for each iteration. That is, the error reduction module 450 can generate new modified quantum instructions $\Psi_M$ and reduced quantum instructions $\Psi_R$ for each iteration including different error reduction pairs and replacement gates. In this manner, aggregate result R* further reduces the effects of systemic errors introduced when executing quantum instructions.

In some cases, quantum cloud system 230 can quantify errors introduced when executing quantum instructions. Quantifying the errors can include comparing results of the quantum instructions, the modified quantum instructions, and reduced quantum instructions. Comparing the results can include comparing results of each iteration of a single set of quantum instructions, comparing results of each iteration between sets of quantum instructions. The error reduction module 450 can determine 570 an error rate based on the comparison or any other method of calculating an error rate. The error reduction module 450 can modify 580 the error reduction gate pairs based on the error rate such that the error rate for modified quantum instructions $\Psi_M$ and reduced quantum instructions $\Psi_R$ decreases. For example, the error reduction module 450 can remove a specific error reduction gate pair from system memory 240 if the specific error reduction pair is associated with higher error rates.

IX.B Adding Quantum Operations Produce the Same Result

Adding gates to quantum instructions to reduce error is a significant problem because quantum gates have complex associative and commutative properties and generally do not commute (i.e., the order of quantum operations matters). That is, in general, if two random gates are added to quantum instructions $\Psi$, determined result R including the added gates can be vastly different than determined result R not including the added gates. Therefore, the error reduction module 450 generates modified (and reduced) quantum instructions $\Psi_M$ by selecting gates that do not change the result of the quantum instructions. In other words, the error reduction module 450 generates modified quantum instructions $\Psi_M$ that reduces unitary errors in the result $R_M$ of the modified quantum instructions $\Psi_M$ by adding gates to quantum instructions $\Psi$. The error reduction module 450 adds quantum gates to the quantum instructions $\Psi$ such that the result $R_M$ of the modified quantum algorithm $\Psi_M$ is the same are the result R of the received quantum algorithm P when executed on an ideal quantum processing 300 system which does not introduce errors. The result $R_M$ of modified quantum algorithm $\Psi_M$ can transforms unitary errors into stochastic errors. As such, the measured result can be more accurate than the result R of quantum algorithm $\Psi$ when executed on a quantum processing system that introduces errors.

For example, quantum cloud system 230 receives a quantum algorithm $\Psi$ including a quantum gate G. Quantum processing system 300 applies the quantum gate G to an initial qubit state $\psi_i$ which produces a resulting qubit state $\psi_r$. Quantum processing system 300 determines the result R by measuring the resulting qubit state $\psi_r$ using the measurement operator M. That is, $$\Psi(k) = G|\psi_i\rangle = |\psi_r\rangle \tag{21}$$

$$\langle\psi_C|M|\psi_r\rangle = R \tag{22}$$

where $\Psi$ is the quantum instructions, G is a quantum gate, $\psi_i$ is an initial qubit state, $\psi_r$ is a resulting qubit state, $\psi_0$ is the measurement basis, M is the measurement operator, and R is the result.

For quantum gate G, there exists some quantum gate E occurring after quantum gate G that is equivalent to some quantum gate F occurring before quantum gate G. Notably, this is true for unitary quantum gates. Non-unitary quantum gates may only satisfy these properties when E and F are the identity. This relationship can be written as:

$$GE=FG \tag{23}$$

where E, F, and G are quantum gates. Further, F' is a quantum gate that can reverse quantum gate F. That is, in this example, quantum gate F' is the conjugate transpose of quantum gate F where F is a unitary quantum gate. Thus, quantum gate F' and quantum gate F have the relationship:

$$F'F=FF'=I \tag{24}$$

where F and F' are quantum gates and I is the identity gate.

Therefore, for any given quantum gate G in quantum instructions $\Psi$ there can be an equivalent series of quantum gates in a modified quantum algorithm $\Psi_M$. For example, the sequence of quantum gates F'G E is equivalent to the quantum gate G. This can be represented by the following relationship:

$$F'GE=G\rightarrow F'FG=G\rightarrow IG=G\rightarrow G=G \tag{25}$$

where F', F, G, and E, are quantum gates, and I is the identity matrix. Based on these relationships, the error reduction module 450 can generate a modified quantum algorithm $\Psi_M$ that is equivalent to the received quantum algorithm. For example, the error reduction module 450 can introduce quantum gates F' and G about E. That is, $$\Psi(k)=G=F'GE=\Psi_M(k) \tag{26}$$

where $\Psi$ is the quantum instructions, $\Psi_M$ is the modified quantum instruction, k is the instruction parameters, and F', G, and E are quantum gates.

Accordingly, result of the modified quantum instructions $\Psi_M$ is the same as the result of quantum instructions $\Psi$ (i.e., $R_M=R$ when executed on an ideal quantum processing system). That is, the sequence of quantum gates F'G E applied to an initial qubit state $\psi_i$ produces a resulting qubit state $\psi_r$ that is equivalent to the resulting qubit state $\psi_i$ of the quantum gate G applied to the same initial qubit state $\psi_i$. Result R determined from the measurement of the resulting qubit state $\psi_r$ from the sequence of gates is the same as the result R determined from the measurement of the resulting qubit state $\psi_r$ using only quantum gate G. This can be shown with the following:

$$\Psi(k)|\psi_i\rangle = G|\psi_i\rangle = |\psi_r\rangle \tag{27}$$

$$\Psi_M(k)|\psi_i\rangle = F'GE|\psi_i\rangle = |\psi_r\rangle \tag{28}$$

$$\langle\psi_0|M|\psi_r\rangle = R \tag{29}$$

where G, F', and E are quantum gates, $\psi_i$ is the initial qubit state, $\psi_r$ is the resulting qubit state, M is the measurement operator, and R is the determined result.

Therefore, in the context of process 500, all of the error reduction gate pairs fulfill the above relationships. That is, shared memory 240 can include any number error reduction gate pairs (e.g., F' and E) associated with a gate (e.g., G) such that the associated error reduction gate pairs fulfill the relationship C A=B C and B' B=I (e.g., G E=F G and F' F=I) where A, B and C are arbitrary quantum gates. There can be any number of error reduction gate pairs associated with a gate. In fact, in an embodiment, the error reduction module 450 identifies as many error reduction gate pairs that fulfill the above relationships as possible. Further, the error reduction gate pairs do not require the symmetries used to have any statistical properties across their random selection (e.g., error reduction gate pairs do not need to form a t-design).

The error reduction module 450 can randomly access any of the error reduction gate pairs for a given gate and generated quantum instructions including any of the randomly selected error reduction gate pairs would produce the same result. Additionally, the error reduction gate pairs may be randomly selected across different symmetries one gate at a time. Randomly accessing error reduction gate pairs for a given gate from a large number of potential gate pairs allows errors introduced into the execution of the quantum instructions $\Psi$ to behave, effectively, as if they are stochastic errors. That is, when error in the quantum instructions $\Psi$ is averaged over many executions, for many random selections of error reduction gate pairs, the unitary error in the result is reduced.

IX.C Minimizing Error by Introducing Appropriate Gates

Concepts described in IX.B also apply to quantum processing systems that introduce error when executing quantum instructions. That is, the error reduction module 450 generates modified (and reduced) quantum instructions by selecting noisy quantum gates that (ideally) do not change the result of the quantum instructions. For example, the error reduction module 450 generates modified quantum instructions $\Psi_M$ that reduce unitary errors in noisy result $R'_M$ of the modified quantum algorithm $\Psi_M$ by adding gates to the quantum instructions $\Psi$ such that the noisy result $R'_M$ would be the same are the noisy result R' quantum instructions $\Psi$ when executed on an quantum processing that does not introduce errors. Additionally, the noisy result $R'_M$ of modified quantum algorithm $\psi_M$ can include fewer unitary errors than the result R of quantum algorithm $\Psi$ when executed on a quantum processing system that introduces errors. For example, this can be shown with the following, using density matrix notation for the qubit states:

$$\Psi(k)\rho_i = G_N\rho_i = \rho_{r'} \tag{30}$$

$$\Psi_M(k)\rho_i = F'_N G_N E_N \rho_i = \rho_{r'} \tag{31}$$

$$tr\{M\rho_{r'}\} = R' \tag{32}$$

where Ψ is the quantum instructions, $\Psi_M$ is the modified quantum instructions, k is the instructions parameters, $G_N$, $F'_N$ and $E_N$ are noisy quantum gates, M is the measurement operator, $\rho_{r'}$ is the resulting noisy qubit state, $\rho_i$ is the initial qubit state, and R' is the noisy result.

However, equations 26-28 assume that the error introduced by noisy quantum gate $G_N$ is equivalent to the error introduced by noisy quantum gates $F'_N$, $G_N$ and $E_N$, which, in many instances, is inaccurate. Therefore, the resulting noisy qubit $\psi_{r',M}$ from the modified quantum algorithm $\Psi_M$ is dissimilar from the resulting noisy qubit $\psi_{r'}$ of the quantum algorithm $\Psi_M$. Similarly, the noisy result $R'_M$ of the modified quantum algorithm $\Psi_M$ is dissimilar from the noisy result R' of the quantum algorithm $\Psi_M$. That is, using density matrix notation for the qubit states:

$$\Psi(k)\rho_i = G_N\rho_i = \rho_{r'} \tag{33}$$

$$tr\{M\rho_{r'}\} = R' \tag{34}$$

$$\Psi_M(k)\rho_i = F'_N G_N E_N \rho_i = \rho_{r',M} \tag{35}$$

$$tr\{M\rho_{r',M}\} = R'_M \tag{36}$$

where Ψ is the quantum instructions, $\Psi_M$ is the modified quantum instructions, $G_N$, $F'_N$ and $E_N$ are noisy quantum gates, M is the measurement operator, $\rho_{r'}$ and are resulting noisy qubit states, $\rho_i$ is the initial qubit state, and R' and $R'_M$ are noisy results. The accuracy of the noisy result $R'_M$ of the modified quantum algorithm $\Psi_M$ and the accuracy of the noisy result R' of the quantum algorithm $\Psi_M$ can be based on the errors introduced by the noisy gates $F'_N$, $G_N$ and $E_N$.

The error reduction module 450 selects quantum gates to generate modified quantum instructions $\Psi_M$. The selected quantum gates can be gates in the quantum instructions Ψ known to include errors, every gate in the quantum instructions Ψ, gates indicated in the classical processing system for replacement, etc. The modified quantum instructions $\Psi_M$ reduce the impact of any errors introduced by quantum gates in the original quantum instruction which may produce a more accurate result than quantum instructions Ψ. Take, for example, quantum instructions Ψ including noisy quantum gate $G_N$. Here, the noisy quantum gate is equivalent to a unitary noise operator $N_{GU}$ (i.e., a noise operator that introduces unitary errors) and a nominal quantum gate G. That is, $$\Psi(k) = G_N = N_{GU} G \tag{37}$$

where Ψ is the quantum instructions, k is the instructions parameters, $G_N$ is a noisy quantum gate, $N_{GU}$ is a unitary noise operator, and G is a nominal quantum gate.

Quantum processing system 300 executes the quantum instructions Ψ by applying the noisy quantum gate $G_N$ to an initial qubit state $\psi_i$ and produces a resulting noisy qubit including unitary errors $\psi_{r',UE}$. Quantum processing system 300 determines a noisy result $R'_{UE}$ including unitary errors by measuring the resulting noisy qubit state including unitary errors $\psi_{r',UE}$ with the measurement operator M. That is, using density matrix notation for the qubit states:

$$\Psi(k)\rho_i = G_N\rho_i = N_{GU} G\rho_i = \rho_{r',UE} \tag{38}$$

$$tr\{M\rho_{r',UE}\} = R'_{UE} \tag{39}$$

where Ψ is the quantum instruction, $G_N$ is a noisy quantum gate, $N_{GU}$ is a unitary noise operator, $\rho_{r',UE}$ is a resulting noisy qubit state including unitary error, $R'_{UE}$ is a noisy result including unitary errors, $\rho_i$ is an initial qubit state, and G is a nominal quantum gate.

When the error reduction module 450 generates modified quantum instructions $\Psi_M$, the modified quantum instructions $\Psi_M$ produce a resulting noisy quantum state in which the determined noisy result $R'_M$ has transformed unitary errors into stochastic errors. For example, the error reduction module 450 generates a modified quantum algorithm $\Psi_M$ by selecting a pair of noisy quantum gates $F'_N$ and $E_N$ to add to quantum instructions Ψ. In some cases, the selected pair of noisy quantum gates $F'_N$ and $E_N$ are previously associated with noisy quantum gate $G_N$ and the error reduction module 450 randomly selects the gates from shared memory 240 (e.g., an error reduction gate pair).

Here, the noisy quantum gates $F'_N$ and $E_N$ introduce stochastic errors and are equivalent to stochastic noise operators $N_{F'S}$ and $N_{ES}$ and nominal quantum gates F' and E, respectively. Noisy quantum gate G introduces unitary errors and is equivalent to unitary noise operator $N_{GU}$ and nominal quantum gate G. That is, $$\Psi_M(k) = F'_N G_N E_N = N_{F'S} F' N_{GU} G N_{ES} E \tag{40}$$

where $\Psi_M$ is the modified quantum instructions, k is the algorithm parameters, $F'_N$, $G_N$, and $E_N$ are noisy quantum gates, $N_{F'S}$, $N_{GU}$, and $N_{ES}$ are noise operators, and F', G, and E, are nominal quantum gates. Noise operators in modified quantum algorithm $\Psi_M$ (e.g., $N_{F'S}$, $N_{ES}$, and $N_{GU}$) can be reduced to noise operators U and V which introduce only stochastic errors That is, $$\Psi_M(k) = UF'GEV \tag{41a}$$

$$\Psi_M(k) = \overline{\sum_i U_i F'_i G E_i V_i} = UGV \tag{41b}$$

$$\text{with } F'_i G E_i = G'' \tag{41c}$$

where $\Psi_M$ is the modified quantum instructions, k is the instructions parameters, U and V are noise operators, G" is independent of i, and F', G, and E, are nominal quantum gates. In an example, U and V are stochastic, while $U_i$ and $V_i$ need not be stochastic. Thus, because any unitary errors in the quantum algorithm are transformed into stochastic errors, the measured result will only include stochastic errors.

Quantum processing system 300 executes the modified quantum algorithm $\Psi_M$ by applying the noisy quantum gates to an initial qubit $\psi_i$ and produces a resulting noisy qubit $\psi_{r',SE}$ including stochastic errors. Quantum processing system 300 determines a noisy result $R'_{SE}$ including stochastic errors by measuring the resulting noisy qubit including stochastic errors $\psi_{r',SE}$ with the measurement operator M. That is, using density matrix notation for the qubit states:

$$\Psi_M(k)\rho_i = F'_N G_N E_N \rho_i = N_{F'S} F' N_{GU} G N_{ES} E \rho_i \ldots \tag{42a}$$

$$= UF'GEV\rho_i = \rho_{r',SE} \tag{42b}$$

$$tr\{M\rho_{r',SE}\} = R'_{UE} = R'_{SE} \tag{43}$$

where $\psi_M$ is the modified quantum instruction, k is the algorithm parameters, $F'_N$, $G_N$, and $E_N$ are noisy quantum gates, $N_{F'S}$, $N_{GU}$, $N_{ES}$, U, and V are noise operators, F', G, and E, are nominal quantum gates, $R'_{SE}$ is a noisy result including unitary errors, M is the measurement operator $\rho_i$ is the initial qubit state, and $\rho_{r',SE}$ is a resulting noisy qubit state including stochastic error.

As previously described, a noisy result including only stochastic errors $R'_{SE}$ and a noisy result including unitary errors $R'_{UE}$ have differing probabilities of generating accurate results. Here, generating the modified quantum instructions $\Psi_M$ reduces the impact of any quantum gates in the original instructions that may include unitary errors. Therefore, the error reduction module 450 modifies the received quantum algorithm such that the determined result of the modified quantum algorithm $\Psi_M$ (i.e., $R'_{SE}$) reduces the impact of unitary errors relative to the as received quantum algorithm (i.e., $R'_{UE}$).

IX.D Multiple Gates and Reducing Gates

These relationships and noise minimization effects apply to quantum instructions including any number of quantum gates. For example, the error reduction module 450 can generate modified quantum instructions by adding randomization quantum gates for any quantum gate included in the quantum instructions.

For example, quantum instructions $\Psi$ includes a noisy quantum gate $G_N$ and a noisy quantum gate $S_N$.

$$\Psi(k) = G_N S_N \tag{44}$$

where $\Psi$ is the quantum instructions, k is the algorithm instructions, and $G_N$ and $S_N$ are noisy quantum gates. The error reduction module 450 generates modified quantum instructions $\Psi_M$ to minimize the unitary errors by adding noisy quantum gates to quantum algorithm T. For example $$\Psi_M(k) = F'_N G_N E_N T_N S_N R_N \tag{45}$$

$$\Psi_M(k) = N_{F'} F' N_G G N_E E N_T T N_S S N_R R \tag{46}$$

$$\Psi_M(k) = U_1 G V_1 U_2 S V_2 \tag{47}$$

where $\Psi_M$ is the modified quantum instruction, k is the algorithm parameters, F', G, E, T, S, and $R_N$ are nominal quantum gates, $F'_N$, $G_N$, $E_N$, $T_N$, $S_N$, and $R_N$ are noisy quantum gates, $N_{F'}$, $N_G$, $N_E$, $N_T$, $N_S$, and $N_R$ are noise operators, and U and V are combined noise operators (which reduce unitary error). Here, noisy gates $G_N$, $S_N$, $F'_N$, $E_N$, $T_N$, and $R_N$ introduce errors into the quantum algorithm $\Psi_M$. The gates $F'_N$ and $E_N$ are an error reduction gate pair for $G_N$, and $T_N$ and $R_N$ are an error reduction gate pair for $S_N$. The selection of random error reduction gate pairs over many executions of the quantum algorithm $\Psi_M$ may, when averaged across the executions, make the error introduced into the quantum algorithm $\Psi_M$ stochastic. Therefore, when taken as a whole over many executions, the determined result for the modified quantum instructions $\Psi_M$ include less unitary errors than quantum instruction T.

In some cases, the error reduction module 450 can generate reduced quantum instructions $\Psi_R$ from modified quantum instruction $\Psi_M$ by replacing two sequential gates from error reduction gate pairs with a replacement gate. The reduced quantum instructions $\Psi_M$ produce the same result as the modified quantum instructions $\Psi_M$ when executed on an ideal quantum processing system. Continuing the above example, the error reduction module 450 can replace noisy quantum gates $E_N$ and $T_N$ with a replacement $Q_N$. For example, $$\Psi_M(k) = F'_N G_N E_N T_N S_N R_N \tag{48}$$

$$\Psi_R(k) = F'_N G_N Q_N S_N R_N \tag{49}$$

$$\Psi_R(k) = U_1 G V_1 U_2 S V_2 \tag{50}$$

where $\Psi_M$ is the modified quantum instruction, $\Psi_R$ is the reduced quantum instructions, k is the instructions parameters, $F'_N$, $G_N$, $E_N$, $T_N$, $S_N$, $Q_N$, and $R_N$ are noisy quantum gates, and U and V are combined noise operators (which reduce unitary error). Here, noisy gates $G_N$ and $S_N$ introduce unitary errors while $F'_N$, $Q_N$ and $R_N$ introduce stochastic errors, the gates $F'_N$ and $E_N$ are an error reduction gate pair for $G_N$, and $T_N$ and $R_N$ are an error reduction gate pair for $S_N$, and Q. In some cases, $V_1$ and $U_1$ can be combined into a single gate Wi and this replacement is only executed if Wi is less complex than $V_1$ and $U_1$. Therefore, the determined result for the reduced quantum instructions $\Psi_R$ include less unitary errors than quantum instruction $\Psi$ while contain fewer quantum gates than modified quantum instructions $\Psi_M$.

Although the detailed description contains many specifics, these should not be construed as limiting the scope of the invention but merely as illustrating different examples and aspects of the invention. It should be appreciated that the scope of the invention includes other embodiments not discussed in detail above. For example, although quantum program instructions are shown herein as coming from main memory 404, the program instructions may originate from any memory store on the quantum cloud system 230. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method, executed on a quantum processor of a quantum computing system, for reducing error in a result of a quantum algorithm by modifying the quantum algorithm to a modified quantum algorithm to determine the result, the method comprising:
   accessing, at random from a datastore of a classical computing system, a primary error reduction operation pair of a plurality of primary error reduction operation pairs associated with a primary quantum operation included in the quantum algorithm, the primary quantum operation producing a primary operation result, and each primary error reduction operation pair producing an equivalent operation result to the primary operation result when quantum operations of the primary error reduction operation pair are executed before and after the primary quantum operation;
   generating, using the classical computing system, the modified quantum algorithm, the modified quantum algorithm comprising:
      a first quantum operation of the primary error reduction operation pair executed before the primary quantum operation,
      a second quantum operation of the primary error reduction operation pair executed after the primary quantum operation, wherein:
      the first quantum operation, the primary quantum operation, and the second quantum operation executed in series produce the primary operation result; and
   executing, using the quantum processor of the quantum computing system, the modified quantum algorithm to determine the result.

2. The method of claim 1, wherein the quantum algorithm includes a secondary quantum operation, the secondary quantum operation producing a secondary operation result, wherein the primary quantum operation and the secondary quantum operation are executed in series to produce a tertiary operation result, and further comprising:
   accessing, at random, a secondary error reduction operation pair of a plurality of secondary error reduction operation pairs associated with the secondary quantum operation, each secondary error reduction operation pair for producing an equivalent operation result to the secondary operation result when executed about the secondary quantum operation; and
   wherein the generated generating the modified quantum algorithm comprises includes:
      a third quantum operation of the secondary error reduction operation pair executed before the secondary quantum operation;
      a fourth quantum operation of the secondary error reduction operation pair executed after the secondary quantum operation, and wherein:
      the third quantum operation, the secondary quantum operation, and the fourth quantum operation are executed in series produce the secondary operation result.

3. The method of claim 2, wherein the modified quantum algorithm includes the first quantum operation, the primary quantum operation, the second quantum operation, the third quantum operation, the secondary quantum operation, and the fourth quantum operation that when executed in series produce the tertiary operation result.

4. The method of claim 2, further comprising:
   determining a replacement quantum operation based on the second quantum operation and the third quantum operation; and
   generating a reduced quantum algorithm by further modifying the modified quantum algorithm, the modification comprising replacing the second quantum operation and the third quantum operation in the modified quantum algorithm with the replacement quantum operation.

5. The method of claim 4, further comprising:
   executing the reduced quantum algorithm on the quantum processor to determine the result of the quantum algorithm.

6. The method of claim 4, wherein the reduced quantum algorithm includes the first quantum operation, the primary quantum operation, the replacement quantum operation, the secondary quantum operation, and the fourth quantum operation that when executed in series produce the tertiary operation result.

7. The method of claim 4, wherein the reduced quantum algorithm generates fewer unitary errors than the quantum algorithm and is executed more quickly than the modified quantum algorithm.

8. The method of claim 1, wherein executing the primary quantum operation and the second quantum operation of the primary error reduction operation pair is equivalent to executing a representative quantum operation and the primary quantum operation, and wherein the first quantum operation of the primary error reduction operation pair is an inverse of the representative quantum operation.

9. The method of claim 8, wherein the first quantum operation of the primary error reduction operation pair executed in series with the representative quantum operation produces an identity matrix.

10. The method of claim 8, wherein the second quantum operation of the primary error reduction operation pair is a unitary operation, and wherein the first quantum operation of the primary error reduction operation pair is a conjugate transpose of the representative quantum operation.

11. The method of claim 1 wherein the modified quantum algorithm generates fewer unitary errors than the quantum algorithm.

12. The method of claim 1, wherein reducing error in the quantum algorithm occurs for any of a superconducting circuit based quantum processor, an ion trapped based quantum processor, or a spin system based quantum processor.

13. The method of claim 1, where a type of the quantum processor is any of a superconducting circuit, an ion trap, or a spin system.

14. A system for reducing error when executing a quantum algorithm by modifying the quantum algorithm to a modified quantum algorithm to determine a result, the system comprising:
   a classical processing system including one or more processors;
   a non-transitory, computer-readable storage medium storing a computer program executable by the classical processing system to perform steps comprising:
      accessing, at random from a datastore of a classical computing system, a primary error reduction operation pair of a plurality of primary error reduction operation pairs associated with a primary quantum operation included in the quantum algorithm, the primary quantum operation producing a primary operation result, and each primary error reduction operation pair producing an equivalent operation result to the primary operation result when quantum operations of the primary error reduction operation pair are executed before and after the primary quantum operation;

generating, using the classical computing system, the modified quantum algorithm, the modified quantum algorithm comprising:
   a first quantum operation of the primary error reduction operation pair executed before the primary quantum operation,
   a second quantum operation of the primary error reduction operation pair executed after the primary quantum operation, wherein:
     the first quantum operation, the primary quantum operation, and the second quantum operation executed in series produce the primary operation result; and a quantum processing system configured to execute the modified quantum algorithm on a quantum processor, wherein the modified quantum algorithm, when executed, determines the result of the quantum algorithm with less error than when the quantum algorithm is executed on the quantum processor.

15. A non-transitory computer-readable storage medium storing computer instructions for reducing error in a result of a quantum algorithm by modifying the quantum algorithm to a modified quantum algorithm to determine the result, the computer instructions, when executed by one or more processors, causing the one or more processors to:

accessing, at random from a datastore of a classical computing system, a primary error reduction operation pair of a plurality of primary error reduction operation pairs associated with a primary quantum operation included in the quantum algorithm, the primary quantum operation producing a primary operation result, and each primary error reduction operation pair producing an equivalent operation result to the primary operation result when quantum operations of the primary error reduction operation pair are executed before and after the primary quantum operation;

generating, using the classical computing system, the modified quantum algorithm, the modified quantum algorithm comprising:
   a first quantum operation of the primary error reduction operation pair executed before the primary quantum operation,
   a second quantum operation of the primary error reduction operation pair executed after the primary quantum operation, wherein:
     the first quantum operation, the primary quantum operation, and the second quantum operation executed in series produce the primary operation result; and executing, using the quantum processor of the quantum computing system, the modified quantum algorithm to determine the result.

\* \* \* \* \*